(12) United States Patent
Jain et al.

(10) Patent No.: US 8,438,645 B2
(45) Date of Patent: May 7, 2013

(54) SECURE CLOCK WITH GRACE PERIODS

(75) Inventors: Amit Jain, Sammamish, WA (US); Brian P. Evans, Redmond, WA (US); Clifford P. Strom, Sammamish, WA (US); Benjamin B. Cutter, Jr., Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1267 days.

(21) Appl. No.: 11/116,884

(22) Filed: Apr. 27, 2005

(65) Prior Publication Data

US 2006/0248596 A1   Nov. 2, 2006

(51) Int. Cl.
*G06F 17/30* (2006.01)
*G06F 17/00* (2006.01)

(52) U.S. Cl.
USPC .............................................. 726/26; 726/27

(58) Field of Classification Search .................. 713/168, 713/156; 705/37, 59; 709/243, 231; 726/26, 726/27
See application file for complete search history.

(56) References Cited

U.S. PATENT DOCUMENTS

| | | |
|---|---|---|
| 3,718,906 A | 2/1973 | Lightner |
| 4,183,085 A | 1/1980 | Roberts |
| 4,202,051 A | 5/1980 | Davida |
| 4,323,921 A | 4/1982 | Guillou |
| 4,405,829 A | 9/1983 | Rivest |
| 4,528,643 A | 7/1985 | Freeny |
| 4,529,870 A | 7/1985 | Chaum |
| 4,558,176 A | 12/1985 | Arnold |
| 4,620,150 A | 10/1986 | Germer |
| 4,658,093 A | 4/1987 | Hellman |
| 4,683,553 A | 7/1987 | Mollier |
| 4,747,139 A | 5/1988 | Taaffe |
| 4,750,034 A | 6/1988 | Lem |
| 4,799,259 A | 1/1989 | Ogrodski |
| 4,817,094 A | 3/1989 | Lebizay |
| 4,827,508 A | 5/1989 | Shear |
| 4,855,730 A | 8/1989 | Venners |
| 4,855,922 A | 8/1989 | Huddleston |
| 4,857,999 A | 8/1989 | Welsh |
| 4,910,692 A | 3/1990 | Outram |
| 4,916,738 A | 4/1990 | Chandra |

(Continued)

FOREIGN PATENT DOCUMENTS

| CA | 2 373 542 | 11/2002 |
|---|---|---|
| CN | 1531673 | 9/2004 |

(Continued)

OTHER PUBLICATIONS

Droz, P; A theft-deterrent solution for the pervasive computingworld; Publication Date: 2000;INSPEC Accession No. 6805873; On pp. 374-379.*

(Continued)

*Primary Examiner* — William Powers
(74) *Attorney, Agent, or Firm* — L. Alan Collins; Collins & Collins Intellectual, LLC

(57) ABSTRACT

A system of controlling playback of digital media. A system of controlling playback of digital media comprising a CE device having a secure clock and a license having a specified grace period disposed upon the CE device in which a digital media file governed by the license may be played for the grace period upon failure of the secure clock.

15 Claims, 6 Drawing Sheets

U.S. PATENT DOCUMENTS

| | | | |
|---|---|---|---|
| 4,926,479 A | 5/1990 | Goldwasser |
| 4,953,209 A | 8/1990 | Ryder |
| 4,959,774 A | 9/1990 | Davis |
| 4,967,273 A | 10/1990 | Greenberg |
| 4,977,594 A | 12/1990 | Shear |
| 5,001,752 A | 3/1991 | Fischer |
| 5,008,935 A | 4/1991 | Roberts |
| 5,012,514 A | 4/1991 | Renton |
| 5,047,928 A | 9/1991 | Wiedemer |
| 5,048,086 A | 9/1991 | Bianco |
| 5,050,213 A | 9/1991 | Shear |
| 5,103,392 A | 4/1992 | Mori |
| 5,103,476 A | 4/1992 | Waite |
| 5,109,413 A | 4/1992 | Comerford |
| 5,117,457 A | 5/1992 | Comerford |
| 5,159,633 A | 10/1992 | Nakamura |
| 5,163,092 A | 11/1992 | McNesby |
| 5,177,790 A | 1/1993 | Hazard |
| 5,193,573 A | 3/1993 | Chronister |
| 5,204,897 A | 4/1993 | Wyman |
| 5,222,134 A | 6/1993 | Waite |
| 5,241,602 A | 8/1993 | Lee |
| 5,249,184 A | 9/1993 | Woest |
| 5,257,282 A | 10/1993 | Adkisson |
| 5,260,999 A | 11/1993 | Wyman |
| 5,261,002 A | 11/1993 | Perlman |
| 5,267,316 A | 11/1993 | Merino Gonzalez |
| 5,269,019 A | 12/1993 | Peterson |
| 5,274,368 A | 12/1993 | Breeden |
| 5,301,268 A | 4/1994 | Takeda |
| 5,303,370 A | 4/1994 | Brosh |
| 5,319,705 A | 6/1994 | Halter |
| 5,327,365 A | 7/1994 | Fujisaki |
| 5,335,346 A | 8/1994 | Fabbio |
| 5,355,161 A | 10/1994 | Bird |
| 5,369,262 A | 11/1994 | Dvorkis |
| 5,406,630 A | 4/1995 | Piosenka |
| 5,410,598 A | 4/1995 | Shear |
| 5,414,861 A | 5/1995 | Horning |
| 5,437,040 A | 7/1995 | Campbell |
| 5,438,508 A | 8/1995 | Wyman |
| 5,440,640 A | 8/1995 | Anshel |
| 5,442,704 A | 8/1995 | Holtey |
| 5,444,780 A | 8/1995 | Hartman, Jr. |
| 5,448,045 A | 9/1995 | Clark |
| 5,457,699 A | 10/1995 | Bode |
| 5,459,867 A | 10/1995 | Adams |
| 5,469,506 A | 11/1995 | Berson |
| 5,473,692 A | 12/1995 | Davis |
| 5,490,216 A | 2/1996 | Richardson, III |
| 5,500,897 A | 3/1996 | Hartman |
| 5,509,070 A | 4/1996 | Schull |
| 5,513,319 A | 4/1996 | Finch |
| 5,522,040 A | 5/1996 | Hofsäss et al. |
| 5,530,846 A | 6/1996 | Strong |
| 5,535,276 A | 7/1996 | Ganesan |
| 5,552,776 A | 9/1996 | Wade |
| 5,553,139 A | 9/1996 | Ross |
| 5,553,143 A | 9/1996 | Ross |
| 5,557,765 A | 9/1996 | Lipner |
| 5,563,799 A | 10/1996 | Brehmer |
| 5,568,552 A | 10/1996 | Davis |
| 5,586,291 A | 12/1996 | Lasker |
| 5,629,980 A | 5/1997 | Stefik |
| 5,634,012 A | 5/1997 | Stefik |
| 5,636,292 A | 6/1997 | Rhoads |
| 5,638,443 A | 6/1997 | Stefik |
| 5,638,513 A | 6/1997 | Ananda |
| 5,671,412 A | 9/1997 | Christiano |
| 5,673,316 A | 9/1997 | Auerbach |
| 5,708,709 A | 1/1998 | Rose |
| 5,710,706 A | 1/1998 | Märkl |
| 5,710,887 A | 1/1998 | Chelliah |
| 5,715,403 A | 2/1998 | Stefik |
| 5,721,788 A | 2/1998 | Powell |
| 5,724,425 A | 3/1998 | Chang |
| 5,745,573 A | 4/1998 | Lipner |
| 5,745,879 A | 4/1998 | Wyman |
| 5,754,657 A | 5/1998 | Schipper |
| 5,754,763 A | 5/1998 | Bereiter |
| 5,757,908 A | 5/1998 | Cooper |
| 5,758,068 A | 5/1998 | Brandt |
| 5,758,069 A | 5/1998 | Olsen |
| 5,761,669 A | 6/1998 | Montague |
| 5,763,832 A | 6/1998 | Anselm |
| 5,764,275 A | 6/1998 | Lappington |
| 5,765,152 A | 6/1998 | Erickson |
| 5,768,382 A | 6/1998 | Schneier |
| 5,771,354 A | 6/1998 | Crawford |
| 5,774,870 A | 6/1998 | Storey |
| 5,787,179 A | 7/1998 | Ogawa |
| 5,790,664 A | 8/1998 | Coley |
| 5,793,839 A | 8/1998 | Farris |
| 5,799,088 A | 8/1998 | Raike |
| 5,799,090 A | 8/1998 | Angert |
| 5,802,592 A | 9/1998 | Chess |
| 5,809,144 A | 9/1998 | Sirbu |
| 5,825,876 A | 10/1998 | Peterson, Jr. |
| 5,825,877 A | 10/1998 | Dan |
| 5,825,883 A | 10/1998 | Archibald |
| 5,841,865 A | 11/1998 | Sudia |
| 5,844,986 A | 12/1998 | Davis |
| 5,845,065 A | 12/1998 | Conte |
| 5,845,281 A | 12/1998 | Benson |
| 5,864,620 A | 1/1999 | Pettitt |
| 5,872,846 A | 2/1999 | Ichikawa |
| 5,875,236 A | 2/1999 | Jankowitz |
| 5,883,670 A | 3/1999 | Sporer |
| 5,883,958 A | 3/1999 | Ishiguro |
| 5,892,900 A | 4/1999 | Ginter |
| 5,892,906 A | 4/1999 | Chou |
| 5,893,086 A | 4/1999 | Schmuck |
| 5,905,799 A | 5/1999 | Ganesan |
| 5,910,987 A | 6/1999 | Ginter |
| 5,917,912 A | 6/1999 | Ginter |
| 5,925,127 A | 7/1999 | Ahmad |
| 5,933,498 A | 8/1999 | Schneck |
| 5,943,248 A | 8/1999 | Clapp |
| 5,943,422 A | 8/1999 | Van Wie |
| 5,948,061 A | 9/1999 | Merriman |
| 5,949,877 A | 9/1999 | Traw |
| 5,951,642 A | 9/1999 | Onoe |
| 5,953,420 A | 9/1999 | Matyas |
| 5,953,502 A | 9/1999 | Helbig, Sr. |
| 5,956,408 A | 9/1999 | Arnold |
| 5,982,891 A | 11/1999 | Ginter |
| 5,983,238 A | 11/1999 | Becker |
| 5,991,406 A | 11/1999 | Lipner |
| 5,994,710 A | 11/1999 | Knee |
| 5,995,625 A | 11/1999 | Sudia |
| 5,999,921 A | 12/1999 | Arsenault |
| 6,005,945 A | 12/1999 | Whitehouse |
| 6,006,332 A | 12/1999 | Rabne |
| 6,009,177 A | 12/1999 | Sudia |
| 6,021,438 A | 2/2000 | Duvvoori |
| 6,023,510 A | 2/2000 | Epstein |
| 6,023,766 A | 2/2000 | Yamamura |
| 6,026,293 A | 2/2000 | Osborn |
| 6,049,789 A | 4/2000 | Frison |
| 6,049,878 A | 4/2000 | Caronni |
| 6,058,188 A | 5/2000 | Chandersekaran |
| 6,058,476 A | 5/2000 | Matsuzaki |
| 6,061,794 A | 5/2000 | Angelo |
| 6,072,874 A | 6/2000 | Shin |
| 6,073,124 A | 6/2000 | Krishnan |
| 6,078,667 A | 6/2000 | Johnson |
| 6,078,909 A | 6/2000 | Knutson |
| 6,085,976 A | 7/2000 | Sehr |
| 6,094,486 A | 7/2000 | Marchant |
| 6,094,487 A | 7/2000 | Butler |
| 6,101,606 A | 8/2000 | Diersch |
| 6,105,069 A | 8/2000 | Franklin |
| 6,112,181 A | 8/2000 | Shear |
| 6,119,229 A | 9/2000 | Martinez |
| 6,122,741 A | 9/2000 | Patterson |
| 6,131,162 A | 10/2000 | Yoshiura |
| 6,141,754 A | 10/2000 | Choy |

| | | | |
|---|---|---|---|
| 6,147,773 A | 11/2000 | Taylor |
| 6,148,417 A | 11/2000 | da Silva |
| 6,151,676 A | 11/2000 | Cuccia |
| 6,158,657 A | 12/2000 | Hall, III |
| 6,163,512 A | 12/2000 | Jeun |
| 6,175,825 B1 | 1/2001 | Fruechtel |
| 6,182,219 B1 | 1/2001 | Feldbau |
| 6,185,678 B1 | 2/2001 | Arbaugh |
| 6,188,995 B1 | 2/2001 | Garst |
| 6,189,146 B1 | 2/2001 | Misra |
| 6,192,392 B1 | 2/2001 | Ginter |
| 6,199,068 B1 | 3/2001 | Carpenter |
| 6,199,169 B1 | 3/2001 | Voth |
| 6,212,634 B1 | 4/2001 | Geer, Jr. |
| 6,219,652 B1 | 4/2001 | Carter |
| 6,219,788 B1 | 4/2001 | Flavin |
| 6,223,291 B1 | 4/2001 | Puhl |
| 6,226,618 B1 | 5/2001 | Downs |
| 6,226,747 B1 | 5/2001 | Larsson |
| 6,230,185 B1 | 5/2001 | Salas |
| 6,233,567 B1 | 5/2001 | Cohen |
| 6,233,600 B1 | 5/2001 | Salas |
| 6,233,685 B1 | 5/2001 | Smith |
| 6,236,728 B1 | 5/2001 | Marchant |
| 6,240,183 B1 | 5/2001 | Marchant |
| 6,243,439 B1 | 6/2001 | Arai |
| 6,243,470 B1 | 6/2001 | Coppersmith |
| 6,243,692 B1 | 6/2001 | Floyd |
| 6,253,193 B1 | 6/2001 | Ginter |
| 6,253,224 B1 | 6/2001 | Brice, Jr. |
| 6,256,774 B1 | 7/2001 | O'Leary et al. |
| 6,260,141 B1 | 7/2001 | Park |
| 6,263,313 B1 | 7/2001 | Milsted |
| 6,263,431 B1 | 7/2001 | Lovelace |
| 6,272,469 B1 | 8/2001 | Koritzinsky |
| 6,275,586 B1 | 8/2001 | Kelly |
| 6,279,111 B1 | 8/2001 | Jensenworth |
| 6,279,156 B1 | 8/2001 | Amberg |
| 6,286,051 B1 | 9/2001 | Becker |
| 6,289,319 B1 | 9/2001 | Lockwood |
| 6,289,452 B1 | 9/2001 | Arnold |
| 6,295,577 B1 | 9/2001 | Anderson |
| 6,298,446 B1 | 10/2001 | Schreiber |
| 6,301,361 B1 | 10/2001 | Mischenko |
| 6,303,924 B1 | 10/2001 | Adan |
| 6,304,915 B1 | 10/2001 | Nguyen |
| 6,314,408 B1 | 11/2001 | Salas |
| 6,314,409 B2 | 11/2001 | Schneck |
| 6,321,335 B1 | 11/2001 | Chu |
| 6,324,287 B1 | 11/2001 | Angert |
| 6,324,683 B1 | 11/2001 | Fuh |
| 6,327,652 B1 | 12/2001 | England |
| 6,330,670 B1 | 12/2001 | England |
| 6,334,189 B1 | 12/2001 | Granger |
| 6,335,972 B1 | 1/2002 | Chandersekaran |
| 6,343,280 B2 | 1/2002 | Clark |
| 6,345,256 B1 | 2/2002 | Milsted |
| 6,345,294 B1 | 2/2002 | O'Toole et al. |
| 6,363,488 B1 | 3/2002 | Ginter |
| 6,367,017 B1 | 4/2002 | Gray |
| 6,373,047 B1 | 4/2002 | Adan |
| 6,374,357 B1 | 4/2002 | Mohammed |
| 6,385,596 B1 | 5/2002 | Wiser |
| 6,385,727 B1 | 5/2002 | Cassagnol |
| 6,389,535 B1 | 5/2002 | Thomlinson |
| 6,389,537 B1 | 5/2002 | Davis |
| 6,389,538 B1 | 5/2002 | Gruse |
| 6,389,541 B1 | 5/2002 | Patterson |
| 6,393,125 B1 | 5/2002 | Barbir |
| 6,393,427 B1 | 5/2002 | Vu |
| 6,397,259 B1 | 5/2002 | Lincke |
| 6,398,245 B1 | 6/2002 | Gruse |
| 6,404,888 B1 | 6/2002 | Barbir |
| 6,405,923 B1 | 6/2002 | Seysen |
| 6,408,170 B1 | 6/2002 | Schmidt |
| 6,409,089 B1 | 6/2002 | Eskicioglu |
| 6,411,941 B1 | 6/2002 | Mullor |
| 6,418,421 B1 | 7/2002 | Hurtado |
| 6,424,714 B1 | 7/2002 | Wasilewski |
| 6,438,690 B1 | 8/2002 | Patel |
| 6,441,813 B1 | 8/2002 | Ishibashi |
| 6,442,529 B1 | 8/2002 | Krishan |
| 6,442,690 B1 | 8/2002 | Howard, Jr. |
| 6,446,207 B1 | 9/2002 | Vanstone |
| 6,449,719 B1 * | 9/2002 | Baker ............................ 713/168 |
| 6,460,140 B1 | 10/2002 | Schoch |
| 6,463,534 B1 | 10/2002 | Geiger |
| 6,477,649 B2 | 11/2002 | Kambayashi |
| 6,490,680 B1 | 12/2002 | Scheidt |
| 6,496,858 B1 | 12/2002 | Frailong |
| 6,502,079 B1 * | 12/2002 | Ball et al. ......................... 705/59 |
| 6,515,676 B1 | 2/2003 | Kasai |
| 6,530,023 B1 | 3/2003 | Nissl |
| 6,532,451 B1 | 3/2003 | Schell |
| 6,539,364 B2 | 3/2003 | Moribatake |
| 6,549,626 B1 | 4/2003 | Al-Salqan |
| 6,550,011 B1 | 4/2003 | Sims, III |
| 6,557,105 B1 | 4/2003 | Tardo et al. |
| 6,567,793 B1 | 5/2003 | Hicks |
| 6,571,216 B1 | 5/2003 | Garg |
| 6,574,609 B1 | 6/2003 | Downs |
| 6,574,611 B1 | 6/2003 | Matsuyama |
| 6,574,612 B1 | 6/2003 | Baratti |
| 6,581,331 B1 | 6/2003 | Kral |
| 6,585,158 B2 | 7/2003 | Norskog |
| 6,587,684 B1 | 7/2003 | Hsu |
| 6,587,837 B1 | 7/2003 | Spagna |
| 6,609,201 B1 | 8/2003 | Folmsbee |
| 6,615,350 B1 | 9/2003 | Schell |
| 6,625,729 B1 | 9/2003 | Angelo |
| 6,631,478 B1 | 10/2003 | Wang |
| 6,646,244 B2 | 11/2003 | Aas |
| 6,654,389 B1 | 11/2003 | Brunheroto |
| 6,664,948 B2 | 12/2003 | Crane |
| 6,665,303 B1 | 12/2003 | Saito |
| 6,665,409 B1 | 12/2003 | Rao |
| 6,668,246 B1 | 12/2003 | Yeung |
| 6,671,737 B1 * | 12/2003 | Snowdon et al. .............. 709/243 |
| 6,671,803 B1 | 12/2003 | Pasieka |
| 6,671,813 B2 | 12/2003 | Ananda |
| 6,678,828 B1 | 1/2004 | Pham |
| 6,681,017 B1 | 1/2004 | Matias |
| 6,684,198 B1 | 1/2004 | Shimizu |
| 6,690,556 B2 | 2/2004 | Smola |
| 6,694,000 B2 | 2/2004 | Ung |
| 6,701,433 B1 | 3/2004 | Schell |
| 6,704,873 B1 | 3/2004 | Underwood |
| 6,708,176 B2 | 3/2004 | Strunk |
| 6,711,263 B1 | 3/2004 | Nordenstam |
| 6,714,921 B2 | 3/2004 | Stefik |
| 6,716,652 B1 | 4/2004 | Ortlieb |
| 6,728,880 B1 | 4/2004 | Sites |
| 6,738,810 B1 | 5/2004 | Kramer |
| 6,763,458 B1 | 7/2004 | Watanabe |
| 6,765,470 B2 | 7/2004 | Shinzaki |
| 6,772,340 B1 | 8/2004 | Peinado |
| 6,775,655 B1 | 8/2004 | Peinado |
| 6,781,956 B1 | 8/2004 | Cheung |
| 6,791,157 B1 | 9/2004 | Casto |
| 6,792,531 B2 | 9/2004 | Heiden |
| 6,792,537 B1 | 9/2004 | Liu |
| 6,801,998 B1 | 10/2004 | Hanna |
| 6,807,542 B2 | 10/2004 | Bantz |
| 6,816,809 B2 | 11/2004 | Circenis |
| 6,816,900 B1 | 11/2004 | Vogel |
| 6,820,063 B1 | 11/2004 | England |
| 6,826,606 B2 | 11/2004 | Freeman |
| 6,826,690 B1 | 11/2004 | Hind |
| 6,832,319 B1 | 12/2004 | Bell |
| 6,834,352 B2 | 12/2004 | Shin |
| 6,839,841 B1 | 1/2005 | Medvinsky |
| 6,844,871 B1 | 1/2005 | Hinckley |
| 6,847,942 B1 | 1/2005 | Land |
| 6,850,252 B1 | 2/2005 | Hoffberg |
| 6,851,051 B1 | 2/2005 | Bolle |
| 6,856,997 B2 | 2/2005 | Lee |
| 6,859,790 B1 | 2/2005 | Nonaka |
| 6,868,433 B1 | 3/2005 | Philyaw |

| Patent No. | Date | Name | | Patent No. | Date | Name | |
|---|---|---|---|---|---|---|---|
| 6,871,283 B1 | 3/2005 | Zurko | | 7,174,320 B2 | 2/2007 | Rothrock | |
| 6,873,975 B1 | 3/2005 | Hatakeyama | | 7,174,452 B2 | 2/2007 | Carr | |
| 6,889,246 B1 | 5/2005 | Kawamoto | | 7,174,457 B1 | 2/2007 | England | |
| 6,895,504 B1 | 5/2005 | Zhang | | 7,200,760 B2 | 4/2007 | Riebe | |
| 6,898,286 B2 | 5/2005 | Murray | | 7,203,966 B2 | 4/2007 | Abburi | |
| 6,918,034 B1 | 7/2005 | Sengodan | | 7,207,039 B2 | 4/2007 | Komarla | |
| 6,920,567 B1 * | 7/2005 | Doherty et al. | 726/22 | 7,213,005 B2 | 5/2007 | Mourad | |
| 6,922,724 B1 | 7/2005 | Freeman | | 7,213,266 B1 | 5/2007 | Maher | |
| 6,934,840 B2 * | 8/2005 | Rich et al. | 713/156 | 7,216,363 B2 * | 5/2007 | Serkowski et al. | 726/20 |
| 6,934,942 B1 | 8/2005 | Chilimbi | | 7,216,368 B2 | 5/2007 | Ishiguro | |
| 6,948,073 B2 | 9/2005 | England | | 7,219,842 B2 | 5/2007 | Wang | |
| 6,954,728 B1 | 10/2005 | Kusumoto | | 7,222,062 B2 | 5/2007 | Goud | |
| 6,957,186 B1 | 10/2005 | Guheen | | 7,224,805 B2 | 5/2007 | Hurst | |
| 6,959,288 B1 | 10/2005 | Medina | | 7,228,437 B2 | 6/2007 | Spagna | |
| 6,959,290 B2 | 10/2005 | Stefik | | 7,233,948 B1 | 6/2007 | Shamoon | |
| 6,959,291 B1 | 10/2005 | Armstrong | | 7,234,144 B2 | 6/2007 | Wilt | |
| 6,961,426 B2 | 11/2005 | Vesely | | 7,236,455 B1 | 6/2007 | Proudler | |
| 6,961,858 B2 | 11/2005 | Fransdonk | | 7,243,366 B2 | 7/2007 | Medvinsky | |
| 6,973,444 B1 | 12/2005 | Blinn | | 7,254,836 B2 | 8/2007 | Alkove | |
| 6,976,162 B1 | 12/2005 | Ellison | | 7,260,721 B2 | 8/2007 | Tanaka | |
| 6,976,163 B1 | 12/2005 | Hind | | 7,266,569 B2 | 9/2007 | Evans | |
| 6,983,049 B2 | 1/2006 | Wee | | 7,266,714 B2 * | 9/2007 | Davies et al. | 713/500 |
| 6,983,050 B1 | 1/2006 | Yacobi | | 7,278,165 B2 | 10/2007 | Molaro | |
| 6,986,042 B2 | 1/2006 | Griffin | | 7,296,154 B2 | 11/2007 | Evans | |
| 6,990,174 B1 | 1/2006 | Eskelinen | | 7,296,296 B2 | 11/2007 | Dunbar | |
| 6,993,137 B2 | 1/2006 | Fransdonk | | 7,299,292 B2 * | 11/2007 | Morten et al. | 709/231 |
| 6,993,648 B2 | 1/2006 | Goodman | | 7,299,358 B2 | 11/2007 | Chateau | |
| 7,000,100 B2 | 2/2006 | Lacombe | | 7,308,573 B2 | 12/2007 | Kostal | |
| 7,000,829 B1 | 2/2006 | Harris | | 7,310,732 B2 | 12/2007 | Matsuyama | |
| 7,006,633 B1 | 2/2006 | Reece | | 7,315,941 B2 | 1/2008 | Ramzan | |
| 7,010,032 B1 | 3/2006 | Kikuchi | | 7,319,579 B2 | 1/2008 | Inoue | |
| 7,010,808 B1 | 3/2006 | Leung | | 7,325,139 B2 | 1/2008 | Ishiguro | |
| 7,013,384 B2 | 3/2006 | Challener | | 7,336,791 B2 | 2/2008 | Ishiguro | |
| 7,017,188 B1 | 3/2006 | Schmeidler | | 7,343,496 B1 | 3/2008 | Hsiang | |
| 7,020,704 B1 | 3/2006 | Lipscomb | | 7,353,209 B1 | 4/2008 | Peinado | |
| 7,020,781 B1 | 3/2006 | Saw | | 7,353,402 B2 | 4/2008 | Krishnaswamy | |
| 7,024,393 B1 | 4/2006 | Peinado | | 7,356,709 B2 | 4/2008 | Gunyakti | |
| 7,028,149 B2 | 4/2006 | Grawrock | | 7,359,807 B2 | 4/2008 | Frank | |
| 7,028,180 B1 | 4/2006 | Aull | | 7,360,253 B2 | 4/2008 | Frank | |
| 7,036,011 B2 | 4/2006 | Grimes | | 7,370,212 B2 | 5/2008 | Bourne | |
| 7,043,633 B1 | 5/2006 | Fink | | 7,376,976 B2 | 5/2008 | Fierstein | |
| 7,047,222 B1 | 5/2006 | Bush | | 7,382,883 B2 | 6/2008 | Cross | |
| 7,047,404 B1 | 5/2006 | Doonan | | 7,383,205 B1 | 6/2008 | Peinado | |
| 7,051,005 B1 | 5/2006 | Peinado | | 7,392,429 B2 | 6/2008 | Frank | |
| 7,052,530 B2 | 5/2006 | Edlund | | 7,395,245 B2 | 7/2008 | Okamoto | |
| 7,054,468 B2 | 5/2006 | Yang | | 7,395,452 B2 | 7/2008 | Nicholson | |
| 7,055,169 B2 | 5/2006 | Delpuch | | 7,406,446 B2 | 7/2008 | Frank | |
| 7,058,819 B2 | 6/2006 | Okaue | | 7,421,413 B2 | 9/2008 | Frank | |
| 7,069,442 B2 | 6/2006 | Sutton, II | | 7,426,752 B2 | 9/2008 | Agrawal | |
| 7,069,595 B2 | 6/2006 | Cognigni | | 7,441,121 B2 | 10/2008 | Siu | |
| 7,073,056 B2 | 7/2006 | Kocher | | 7,441,246 B2 | 10/2008 | Auerbach | |
| 7,073,063 B2 | 7/2006 | Peinado | | 7,451,202 B2 | 11/2008 | Nakahara | |
| 7,076,652 B2 | 7/2006 | Ginter | | 7,461,249 B1 | 12/2008 | Pearson | |
| 7,080,039 B1 | 7/2006 | Marsh | | 7,464,103 B2 | 12/2008 | Strom | |
| 7,080,043 B2 | 7/2006 | Chase, Jr. | | 7,484,103 B2 | 1/2009 | Woo | |
| 7,089,594 B2 | 8/2006 | Lal | | 7,490,356 B2 | 2/2009 | Lieblich | |
| 7,095,852 B2 | 8/2006 | Wack | | 7,493,487 B2 | 2/2009 | Phillips | |
| 7,096,469 B1 | 8/2006 | Kubala | | 7,494,277 B2 | 2/2009 | Setala | |
| 7,097,357 B2 | 8/2006 | Johnson | | 7,500,267 B2 | 3/2009 | McKune | |
| 7,103,574 B1 | 9/2006 | Peinado | | 7,502,945 B2 | 3/2009 | Venkatesh | |
| 7,113,912 B2 | 9/2006 | Stefik | | 7,519,816 B2 | 4/2009 | Phillips | |
| 7,116,969 B2 * | 10/2006 | Park | 455/410 | 7,526,649 B2 | 4/2009 | Wiseman | |
| 7,117,183 B2 | 10/2006 | Blair | | 7,539,863 B2 | 5/2009 | Phillips | |
| 7,120,250 B2 | 10/2006 | Candelore | | 7,540,024 B2 | 5/2009 | Phillips | |
| 7,121,460 B1 | 10/2006 | Parsons | | 7,549,060 B2 | 6/2009 | Bourne | |
| 7,123,608 B1 | 10/2006 | Scott | | 7,552,331 B2 | 6/2009 | Evans | |
| 7,124,938 B1 | 10/2006 | Marsh | | 7,558,463 B2 | 7/2009 | Jain | |
| 7,127,579 B2 | 10/2006 | Zimmer | | 7,562,220 B2 | 7/2009 | Frank | |
| 7,130,951 B1 | 10/2006 | Christie | | 7,565,325 B2 | 7/2009 | Lenard | |
| 7,133,846 B1 | 11/2006 | Ginter | | 7,568,096 B2 | 7/2009 | Parks | |
| 7,136,838 B1 | 11/2006 | Peinado | | 7,584,502 B2 | 9/2009 | Alkove | |
| 7,136,945 B2 | 11/2006 | Gibbs | | 7,590,841 B2 | 9/2009 | Sherwani | |
| 7,143,066 B2 | 11/2006 | Shear | | 7,596,784 B2 | 9/2009 | Abrams | |
| 7,143,297 B2 | 11/2006 | Buchheit | | 7,610,631 B2 | 10/2009 | Frank | |
| 7,145,919 B2 | 12/2006 | Krishnarajah | | 7,617,401 B2 | 11/2009 | Marsh | |
| 7,146,504 B2 | 12/2006 | Helin | | 7,644,239 B2 | 1/2010 | Ergan | |
| 7,162,645 B2 | 1/2007 | Iguchi | | 7,653,943 B2 | 1/2010 | Evans | |
| 7,171,539 B2 | 1/2007 | Mansell | | 7,665,143 B2 | 2/2010 | Havens | |
| 7,171,662 B1 | 1/2007 | Misra | | 7,669,056 B2 | 2/2010 | Frank | |

| Patent/Publication | Date | Name |
|---|---|---|
| 7,680,744 B2 | 3/2010 | Blinn |
| 7,694,153 B2 | 4/2010 | Ahdout |
| 7,703,141 B2 | 4/2010 | Alkove |
| 7,739,505 B2 | 6/2010 | Reneris |
| 7,752,674 B2 | 7/2010 | Evans |
| 7,770,205 B2 | 8/2010 | Frank |
| 7,809,646 B2 | 10/2010 | Rose |
| 7,810,163 B2 | 10/2010 | Evans |
| 7,814,532 B2 | 10/2010 | Cromer |
| 7,856,404 B2 | 12/2010 | Evans |
| 7,877,607 B2 | 1/2011 | Circenis |
| 7,891,007 B2 | 2/2011 | Waxman |
| 7,900,140 B2 | 3/2011 | Mohammed |
| 7,903,117 B2 | 3/2011 | Howell |
| 7,958,029 B1 | 6/2011 | Bobich |
| 7,979,721 B2 | 7/2011 | Westerinen |
| 8,060,923 B2 | 11/2011 | Cutter |
| 8,074,287 B2 | 12/2011 | Barde |
| 2001/0010076 A1 | 7/2001 | Wray |
| 2001/0011253 A1 | 8/2001 | Coley |
| 2001/0021252 A1 | 9/2001 | Carter |
| 2001/0034711 A1 | 10/2001 | Tashenberg |
| 2001/0044782 A1 | 11/2001 | Hughes |
| 2001/0049667 A1 | 12/2001 | Moribatake |
| 2001/0051996 A1 | 12/2001 | Cooper |
| 2001/0052077 A1 | 12/2001 | Fung |
| 2001/0053223 A1 | 12/2001 | Ishibashi |
| 2001/0056413 A1 | 12/2001 | Suzuki |
| 2001/0056539 A1 | 12/2001 | Pavlin |
| 2002/0002597 A1 | 1/2002 | Morrell, Jr. |
| 2002/0002674 A1 | 1/2002 | Grimes |
| 2002/0004773 A1 | 1/2002 | Xu |
| 2002/0006204 A1 | 1/2002 | England |
| 2002/0007310 A1 | 1/2002 | Long |
| 2002/0007456 A1 | 1/2002 | Peinado |
| 2002/0013772 A1 | 1/2002 | Peinado |
| 2002/0018566 A1 | 2/2002 | Kawatsura |
| 2002/0019814 A1* | 2/2002 | Ganesan ............... 705/59 |
| 2002/0023212 A1 | 2/2002 | Proudler |
| 2002/0026574 A1 | 2/2002 | Watanabe |
| 2002/0038231 A1 | 3/2002 | Hasebe |
| 2002/0044654 A1 | 4/2002 | Maeda |
| 2002/0046098 A1 | 4/2002 | Maggio |
| 2002/0048369 A1 | 4/2002 | Ginter |
| 2002/0049679 A1 | 4/2002 | Russell |
| 2002/0055906 A1 | 5/2002 | Katz |
| 2002/0056042 A1 | 5/2002 | van der Kaay |
| 2002/0056747 A1 | 5/2002 | Matsuyama |
| 2002/0063933 A1 | 5/2002 | Maeda |
| 2002/0065781 A1 | 5/2002 | Hillegass |
| 2002/0067767 A1 | 6/2002 | Sugahara |
| 2002/0073068 A1 | 6/2002 | Guha |
| 2002/0091569 A1 | 7/2002 | Kitaura |
| 2002/0095603 A1 | 7/2002 | Godwin |
| 2002/0107701 A1 | 8/2002 | Batty |
| 2002/0107806 A1 | 8/2002 | Higashi |
| 2002/0108050 A1 | 8/2002 | Raley |
| 2002/0111916 A1 | 8/2002 | Coronna |
| 2002/0112171 A1 | 8/2002 | Ginter |
| 2002/0118835 A1 | 8/2002 | Uemura |
| 2002/0123964 A1 | 9/2002 | Kramer |
| 2002/0123968 A1 | 9/2002 | Okayama |
| 2002/0124212 A1 | 9/2002 | Nitschke |
| 2002/0129359 A1 | 9/2002 | Lichner |
| 2002/0138549 A1 | 9/2002 | Urien |
| 2002/0141451 A1 | 10/2002 | Gates |
| 2002/0144131 A1 | 10/2002 | Spacey |
| 2002/0147601 A1 | 10/2002 | Fagan |
| 2002/0147782 A1 | 10/2002 | Dimitrova |
| 2002/0147912 A1 | 10/2002 | Shmueli |
| 2002/0156743 A1 | 10/2002 | DeTreville |
| 2002/0157002 A1 | 10/2002 | Messerges |
| 2002/0166056 A1 | 11/2002 | Johnson |
| 2002/0169954 A1 | 11/2002 | Bandini |
| 2002/0169974 A1* | 11/2002 | McKune ............... 713/200 |
| 2002/0178071 A1 | 11/2002 | Walker |
| 2002/0184482 A1 | 12/2002 | Lacombe |
| 2002/0184508 A1 | 12/2002 | Bialick |
| 2002/0184515 A1 | 12/2002 | Oho |
| 2002/0186843 A1* | 12/2002 | Weinstein et al. ............ 380/201 |
| 2002/0190876 A1 | 12/2002 | Lai |
| 2002/0193101 A1 | 12/2002 | McAlinden |
| 2002/0194132 A1 | 12/2002 | Pearson |
| 2002/0194474 A1 | 12/2002 | Natsuno |
| 2002/0198845 A1 | 12/2002 | Lao |
| 2002/0198846 A1 | 12/2002 | Lao |
| 2003/0005135 A1 | 1/2003 | Inoue |
| 2003/0005335 A1 | 1/2003 | Watanabe |
| 2003/0014323 A1 | 1/2003 | Scheer |
| 2003/0014496 A1 | 1/2003 | Spencer |
| 2003/0018491 A1 | 1/2003 | Nakahara |
| 2003/0021416 A1 | 1/2003 | Brown |
| 2003/0023564 A1 | 1/2003 | Padhye |
| 2003/0027549 A1 | 2/2003 | Kiel |
| 2003/0028454 A1 | 2/2003 | Ooho |
| 2003/0028490 A1 | 2/2003 | Miura |
| 2003/0035409 A1 | 2/2003 | Wang |
| 2003/0037246 A1 | 2/2003 | Goodman |
| 2003/0040960 A1 | 2/2003 | Eckmann |
| 2003/0041008 A1* | 2/2003 | Grey et al. ............ 705/37 |
| 2003/0041257 A1 | 2/2003 | Wee |
| 2003/0046026 A1 | 3/2003 | Levy |
| 2003/0046238 A1 | 3/2003 | Nonaka |
| 2003/0048473 A1 | 3/2003 | Rosen |
| 2003/0053630 A1 | 3/2003 | Elliott |
| 2003/0056107 A1 | 3/2003 | Cammack |
| 2003/0056118 A1 | 3/2003 | Troyansky |
| 2003/0063750 A1 | 4/2003 | Medvinsky |
| 2003/0065918 A1 | 4/2003 | Willey |
| 2003/0069854 A1 | 4/2003 | Hsu |
| 2003/0069981 A1 | 4/2003 | Trovato |
| 2003/0078853 A1 | 4/2003 | Peinado |
| 2003/0081592 A1 | 5/2003 | Krishnarajah |
| 2003/0084104 A1 | 5/2003 | Salem |
| 2003/0084278 A1 | 5/2003 | Cromer |
| 2003/0084285 A1 | 5/2003 | Cromer |
| 2003/0084306 A1 | 5/2003 | Abburi |
| 2003/0084337 A1 | 5/2003 | Simionescu |
| 2003/0084352 A1 | 5/2003 | Schwartz |
| 2003/0088500 A1 | 5/2003 | Shinohara |
| 2003/0093694 A1 | 5/2003 | Medvinsky |
| 2003/0097596 A1 | 5/2003 | Muratov |
| 2003/0108164 A1 | 6/2003 | Laurin |
| 2003/0110388 A1 | 6/2003 | Pavlin |
| 2003/0115458 A1 | 6/2003 | Song |
| 2003/0120935 A1 | 6/2003 | Teal |
| 2003/0126519 A1 | 7/2003 | Odorcic |
| 2003/0131252 A1 | 7/2003 | Barton |
| 2003/0131353 A1 | 7/2003 | Blom |
| 2003/0133576 A1 | 7/2003 | Grumiaux |
| 2003/0135380 A1 | 7/2003 | Lehr |
| 2003/0149670 A1 | 8/2003 | Cronce |
| 2003/0149671 A1 | 8/2003 | Yamamoto |
| 2003/0156572 A1 | 8/2003 | Hui |
| 2003/0156719 A1 | 8/2003 | Cronce |
| 2003/0161473 A1 | 8/2003 | Fransdonk |
| 2003/0163383 A1 | 8/2003 | Engelhart |
| 2003/0163712 A1 | 8/2003 | LaMothe |
| 2003/0167392 A1 | 9/2003 | Fransdonk |
| 2003/0172345 A1 | 9/2003 | Engelsberg |
| 2003/0172376 A1 | 9/2003 | Coffin, III |
| 2003/0185395 A1 | 10/2003 | Lee |
| 2003/0185399 A1 | 10/2003 | Ishiguro |
| 2003/0187801 A1 | 10/2003 | Chase, Jr. |
| 2003/0188117 A1 | 10/2003 | Yoshino |
| 2003/0188165 A1 | 10/2003 | Sutton, II |
| 2003/0188179 A1 | 10/2003 | Challener |
| 2003/0194092 A1 | 10/2003 | Parks |
| 2003/0194094 A1 | 10/2003 | Lampson |
| 2003/0196102 A1 | 10/2003 | McCarroll |
| 2003/0196106 A1 | 10/2003 | Erfani |
| 2003/0198350 A1 | 10/2003 | Foster |
| 2003/0200336 A1 | 10/2003 | Pal |
| 2003/0204738 A1 | 10/2003 | Morgan |
| 2003/0208338 A1 | 11/2003 | Challener |
| 2003/0208573 A1 | 11/2003 | Harrison |
| 2003/0229702 A1 | 12/2003 | Hensbergen |
| 2003/0233553 A1* | 12/2003 | Parks et al. ............ 713/178 |

| Pub. No. | Date | Name | | Pub. No. | Date | Name |
|---|---|---|---|---|---|---|
| 2003/0236820 A1 | 12/2003 | Tierney | | 2005/0015343 A1 | 1/2005 | Nagai |
| 2003/0236978 A1 | 12/2003 | Evans | | 2005/0021944 A1 | 1/2005 | Craft |
| 2004/0001088 A1 | 1/2004 | Stancil | | 2005/0021989 A1 | 1/2005 | Johnson |
| 2004/0001594 A1 | 1/2004 | Krishnaswamy | | 2005/0021992 A1 | 1/2005 | Aida |
| 2004/0003139 A1 | 1/2004 | Cottrille | | 2005/0028000 A1 | 2/2005 | Bulusu |
| 2004/0003190 A1 | 1/2004 | Childs | | 2005/0028151 A1 | 2/2005 | Roth |
| 2004/0003268 A1 | 1/2004 | Bourne | | 2005/0033747 A1 | 2/2005 | Wittkotter |
| 2004/0003269 A1 | 1/2004 | Waxman | | 2005/0039013 A1 | 2/2005 | Bajikar |
| 2004/0003270 A1 | 1/2004 | Bourne | | 2005/0044197 A1 | 2/2005 | Lai |
| 2004/0003288 A1 | 1/2004 | Wiseman | | 2005/0044397 A1 | 2/2005 | Bjorkengren |
| 2004/0010440 A1 | 1/2004 | Lenard | | 2005/0050329 A1 | 3/2005 | Wilding et al. ............... 713/171 |
| 2004/0010602 A1 | 1/2004 | Van Vleck | | 2005/0050355 A1 | 3/2005 | Graunke |
| 2004/0019456 A1 | 1/2004 | Circenis | | 2005/0060388 A1 | 3/2005 | Tatsumi |
| 2004/0023636 A1 | 2/2004 | Gurel | | 2005/0065880 A1 | 3/2005 | Amato |
| 2004/0030912 A1 | 2/2004 | Merkle, Jr. | | 2005/0069039 A1 | 3/2005 | Crinon |
| 2004/0034816 A1 | 2/2004 | Richard | | 2005/0080701 A1 | 4/2005 | Tunney |
| 2004/0039916 A1 | 2/2004 | Aldis | | 2005/0081042 A1 | 4/2005 | Venkatesan et al. .......... 713/176 |
| 2004/0039924 A1 | 2/2004 | Baldwin | | 2005/0086174 A1* | 4/2005 | Eng ................................ 705/59 |
| 2004/0039932 A1 | 2/2004 | Elazar | | 2005/0091104 A1 | 4/2005 | Abraham |
| 2004/0039960 A1 | 2/2004 | Kassayan | | 2005/0097204 A1 | 5/2005 | Horowitz |
| 2004/0042451 A1 | 3/2004 | Takaku | | 2005/0102181 A1 | 5/2005 | Scroggie |
| 2004/0044629 A1 | 3/2004 | Rhodes | | 2005/0108547 A1 | 5/2005 | Sakai |
| 2004/0054630 A1 | 3/2004 | Ginter | | 2005/0108564 A1 | 5/2005 | Freeman |
| 2004/0054678 A1 | 3/2004 | Okamoto | | 2005/0120125 A1* | 6/2005 | Morten et al. ................. 709/231 |
| 2004/0054907 A1 | 3/2004 | Chateau | | 2005/0120251 A1 | 6/2005 | Fukumori |
| 2004/0054908 A1 | 3/2004 | Circenis | | 2005/0125673 A1 | 6/2005 | Cheng |
| 2004/0054909 A1 | 3/2004 | Serkowski | | 2005/0129296 A1 | 6/2005 | Setala |
| 2004/0054912 A1 | 3/2004 | Adent | | 2005/0132150 A1 | 6/2005 | Jewell |
| 2004/0059937 A1 | 3/2004 | Nakano | | 2005/0138338 A1 | 6/2005 | Sodani |
| 2004/0064351 A1 | 4/2004 | Mikurak | | 2005/0138370 A1 | 6/2005 | Goud |
| 2004/0064707 A1 | 4/2004 | McCann | | 2005/0138388 A1 | 6/2005 | Paganetti |
| 2004/0067746 A1 | 4/2004 | Johnson | | 2005/0138389 A1 | 6/2005 | Catherman |
| 2004/0073670 A1 | 4/2004 | Chack | | 2005/0138406 A1 | 6/2005 | Cox |
| 2004/0088541 A1 | 5/2004 | Messerges | | 2005/0138423 A1 | 6/2005 | Ranganathan |
| 2004/0088548 A1 | 5/2004 | Smetters | | 2005/0141717 A1 | 6/2005 | Cromer |
| 2004/0093371 A1 | 5/2004 | Burrows | | 2005/0144099 A1 | 6/2005 | Deb |
| 2004/0093508 A1 | 5/2004 | Foerstner | | 2005/0149722 A1 | 7/2005 | Wiseman |
| 2004/0103305 A1 | 5/2004 | Ginter | | 2005/0149729 A1 | 7/2005 | Zimmer |
| 2004/0107125 A1 | 6/2004 | Guheen | | 2005/0163052 A1 | 7/2005 | Savage |
| 2004/0107356 A1 | 6/2004 | Shamoon | | 2005/0166051 A1 | 7/2005 | Buer |
| 2004/0107359 A1 | 6/2004 | Kawano | | 2005/0169444 A1 | 8/2005 | Inon |
| 2004/0107368 A1 | 6/2004 | Colvin | | 2005/0169467 A1 | 8/2005 | Risan |
| 2004/0111615 A1 | 6/2004 | Nyang | | 2005/0172121 A1 | 8/2005 | Risan |
| 2004/0123127 A1 | 6/2004 | Teicher | | 2005/0177875 A1 | 8/2005 | Kamperman |
| 2004/0125755 A1 | 7/2004 | Roberts | | 2005/0182921 A1 | 8/2005 | Duncan |
| 2004/0125757 A1 | 7/2004 | Mela | | 2005/0182940 A1 | 8/2005 | Sutton, II |
| 2004/0125791 A1 | 7/2004 | Hoffmann | | 2005/0188843 A1 | 9/2005 | Edlund |
| 2004/0127196 A1 | 7/2004 | Dabbish | | 2005/0192099 A1 | 9/2005 | Nguyen |
| 2004/0128251 A1 | 7/2004 | Adam | | 2005/0198510 A1 | 9/2005 | Robert |
| 2004/0133794 A1 | 7/2004 | Kocher | | 2005/0203801 A1 | 9/2005 | Morgenstern |
| 2004/0139027 A1 | 7/2004 | Molaro | | 2005/0204391 A1 | 9/2005 | Hunleth |
| 2004/0139312 A1 | 7/2004 | Medvinsky | | 2005/0210252 A1 | 9/2005 | Freeman |
| 2004/0143736 A1 | 7/2004 | Cross | | 2005/0213761 A1 | 9/2005 | Walmsley |
| 2004/0143760 A1 | 7/2004 | Alkove | | 2005/0216577 A1 | 9/2005 | Durham |
| 2004/0146015 A1 | 7/2004 | Cross | | 2005/0221766 A1 | 10/2005 | Brizek |
| 2004/0158709 A1 | 8/2004 | Narin | | 2005/0223415 A1 | 10/2005 | Oho |
| 2004/0158731 A1 | 8/2004 | Narin | | 2005/0226170 A1 | 10/2005 | Relan |
| 2004/0158742 A1 | 8/2004 | Srinivasan | | 2005/0235141 A1 | 10/2005 | Ibrahim |
| 2004/0168073 A1 | 8/2004 | Bourne | | 2005/0240533 A1 | 10/2005 | Strom |
| 2004/0168077 A1 | 8/2004 | Waxman | | 2005/0246521 A1 | 11/2005 | Bade |
| 2004/0184605 A1 | 9/2004 | Soliman | | 2005/0246525 A1 | 11/2005 | Bade |
| 2004/0193919 A1 | 9/2004 | Dabbish | | 2005/0246552 A1 | 11/2005 | Bade |
| 2004/0199769 A1 | 10/2004 | Proudler | | 2005/0254526 A1 | 11/2005 | Wang |
| 2004/0205028 A1 | 10/2004 | Verosub | | 2005/0257073 A1 | 11/2005 | Bade |
| 2004/0205357 A1 | 10/2004 | Kuo | | 2005/0265555 A1 | 12/2005 | Pippuri |
| 2004/0205510 A1 | 10/2004 | Rising, III | | 2005/0268115 A1 | 12/2005 | Barde |
| 2004/0210535 A1 | 10/2004 | Erickson | | 2005/0268174 A1 | 12/2005 | Kumagai |
| 2004/0220858 A1 | 11/2004 | Maggio | | 2005/0275866 A1 | 12/2005 | Corlett |
| 2004/0225894 A1 | 11/2004 | Colvin | | 2005/0278519 A1 | 12/2005 | Luebke |
| 2004/0236717 A1 | 11/2004 | Demartini | | 2005/0279371 A1 | 12/2005 | Billard |
| 2004/0243819 A1 | 12/2004 | Bourne | | 2005/0279827 A1 | 12/2005 | Mascavage |
| 2004/0249759 A1 | 12/2004 | Higashi | | 2005/0283601 A1 | 12/2005 | Tahan |
| 2004/0255000 A1 | 12/2004 | Simionescu | | 2005/0286476 A1 | 12/2005 | Crosswy |
| 2004/0261093 A1 | 12/2004 | Rebaud | | 2005/0289076 A1 | 12/2005 | Lambert |
| 2004/0268120 A1 | 12/2004 | Mirtal | | 2005/0289177 A1 | 12/2005 | Hohmann, II |
| 2005/0002525 A1 | 1/2005 | Alkove | | 2005/0289343 A1 | 12/2005 | Tahan |
| 2005/0008240 A1 | 1/2005 | Banerji | | 2006/0010076 A1 | 1/2006 | Cutter |
| 2005/0010531 A1 | 1/2005 | Kushalnagar | | 2006/0010326 A1 | 1/2006 | Bade |
| 2005/0010536 A1 | 1/2005 | Cochran | | 2006/0014521 A1 | 1/2006 | Chen |

| | | |
|---|---|---|
| 2006/0015717 A1 | 1/2006 | Liu et al. |
| 2006/0015718 A1 | 1/2006 | Liu |
| 2006/0015732 A1 | 1/2006 | Liu |
| 2006/0020554 A1 | 1/2006 | Septon |
| 2006/0020784 A1 | 1/2006 | Jonker |
| 2006/0020821 A1 | 1/2006 | Waltermann |
| 2006/0020860 A1 | 1/2006 | Tardif |
| 2006/0026418 A1 | 2/2006 | Bade |
| 2006/0026419 A1 | 2/2006 | Arndt |
| 2006/0026422 A1 | 2/2006 | Bade |
| 2006/0045267 A1 | 3/2006 | Moore |
| 2006/0053112 A1 | 3/2006 | Chitkara |
| 2006/0055506 A1 | 3/2006 | Nicolas |
| 2006/0072748 A1 | 4/2006 | Buer |
| 2006/0072762 A1 | 4/2006 | Buer |
| 2006/0074600 A1 | 4/2006 | Sastry |
| 2006/0075014 A1 | 4/2006 | Tharappel |
| 2006/0075223 A1 | 4/2006 | Bade |
| 2006/0085634 A1 | 4/2006 | Jain |
| 2006/0085637 A1 | 4/2006 | Pinkas |
| 2006/0085646 A1 | 4/2006 | Cutter |
| 2006/0085844 A1 | 4/2006 | Buer |
| 2006/0089917 A1 | 4/2006 | Strom |
| 2006/0090084 A1 | 4/2006 | Buer |
| 2006/0100010 A1 | 5/2006 | Gatto |
| 2006/0104356 A1 | 5/2006 | Crinon |
| 2006/0106845 A1 | 5/2006 | Frank |
| 2006/0106920 A1 | 5/2006 | Steeb |
| 2006/0107306 A1 | 5/2006 | Thirumalai |
| 2006/0107328 A1 | 5/2006 | Frank |
| 2006/0107335 A1 | 5/2006 | Frank |
| 2006/0112267 A1 | 5/2006 | Zimmer |
| 2006/0117177 A1 | 6/2006 | Buer |
| 2006/0129496 A1 | 6/2006 | Chow |
| 2006/0129824 A1 | 6/2006 | Hoff |
| 2006/0130130 A1 | 6/2006 | Kablotsky |
| 2006/0143431 A1 | 6/2006 | Rothman |
| 2006/0149966 A1 | 7/2006 | Buskey |
| 2006/0156416 A1 | 7/2006 | Huotari |
| 2006/0161635 A1 | 7/2006 | Lamkin |
| 2006/0165005 A1 | 7/2006 | Frank |
| 2006/0167814 A1 | 7/2006 | Peinado |
| 2006/0167815 A1 | 7/2006 | Peinado |
| 2006/0167985 A1 | 7/2006 | Albanese |
| 2006/0168451 A1 | 7/2006 | Ishibashi |
| 2006/0168664 A1 | 7/2006 | Frank |
| 2006/0173787 A1 | 8/2006 | Weber |
| 2006/0174110 A1 | 8/2006 | Strom |
| 2006/0184790 A1 | 8/2006 | Oliveira |
| 2006/0193474 A1 | 8/2006 | Fransdonk |
| 2006/0206618 A1 | 9/2006 | Zimmer |
| 2006/0212363 A1 | 9/2006 | Peinado |
| 2006/0212945 A1 | 9/2006 | Donlin |
| 2006/0213997 A1 | 9/2006 | Frank |
| 2006/0229990 A1 | 10/2006 | Shimoji |
| 2006/0235798 A1 | 10/2006 | Alkove |
| 2006/0235799 A1 | 10/2006 | Evans |
| 2006/0235801 A1 | 10/2006 | Evans |
| 2006/0242406 A1 | 10/2006 | Barde |
| 2006/0248594 A1 | 11/2006 | Grigorovitch |
| 2006/0248596 A1 | 11/2006 | Jain |
| 2006/0265758 A1 | 11/2006 | Khandelwal |
| 2006/0268099 A1 | 11/2006 | Potrebic |
| 2006/0272026 A1 | 11/2006 | Niwano |
| 2006/0282319 A1 | 12/2006 | Maggio |
| 2006/0282899 A1 | 12/2006 | Raciborski |
| 2007/0003064 A1 | 1/2007 | Wiseman |
| 2007/0016594 A1 | 1/2007 | Visharam |
| 2007/0016784 A1 | 1/2007 | Vauclair |
| 2007/0033102 A1 | 2/2007 | Frank |
| 2007/0033419 A1 | 2/2007 | Kocher |
| 2007/0058807 A1 | 3/2007 | Marsh |
| 2007/0078777 A1 | 4/2007 | Demartini |
| 2007/0112681 A1 | 5/2007 | Niwano |
| 2007/0171903 A1 | 7/2007 | Zeng |
| 2007/0269044 A1 | 11/2007 | Bruestle |
| 2007/0274393 A1 | 11/2007 | Toma |
| 2007/0280422 A1 | 12/2007 | Setala |
| 2007/0288391 A1 | 12/2007 | Nakamura |
| 2008/0075168 A1 | 3/2008 | Toma |
| 2008/0187284 A1 | 8/2008 | Ikeda |
| 2009/0070454 A1 | 3/2009 | McKinnon, III |
| 2009/0132815 A1 | 5/2009 | Ginter |
| 2009/0158036 A1 | 6/2009 | Barde |
| 2010/0177891 A1 | 7/2010 | Keidar |
| 2010/0280954 A1 | 11/2010 | Khandelwal |
| 2011/0128290 A1 | 6/2011 | Howell |
| 2012/0036562 A1 | 2/2012 | Cutter |
| 2012/0137127 A1 | 5/2012 | Jain |

FOREIGN PATENT DOCUMENTS

| | | |
|---|---|---|
| EP | 0613073 | 8/1994 |
| EP | 0635790 | 1/1995 |
| EP | 0665486 | 8/1995 |
| EP | 0709760 | 5/1996 |
| EP | 0715245 | 6/1996 |
| EP | 0725512 | 8/1996 |
| EP | 0752663 | 1/1997 |
| EP | 0778512 | 6/1997 |
| EP | 0798892 | 10/1997 |
| EP | 0843449 | 5/1998 |
| EP | 0849658 | 6/1998 |
| EP | 0874300 | 10/1998 |
| EP | 0887723 | 12/1998 |
| EP | 0907120 | 4/1999 |
| EP | 1041823 | 10/2000 |
| EP | 1061465 | 12/2000 |
| EP | 1085396 | 3/2001 |
| EP | 1120967 | 8/2001 |
| EP | 0715247 | 3/2003 |
| EP | 1292065 | 3/2003 |
| EP | 0715246 | 4/2003 |
| EP | 1346755 | 9/2003 |
| EP | 1363424 | 11/2003 |
| EP | 1376307 | 1/2004 |
| EP | 1378811 | 1/2004 |
| EP | 1378812 | 1/2004 |
| EP | 1 387 237 | 2/2004 |
| EP | 1 429 224 | 6/2004 |
| EP | 1223722 | 8/2004 |
| EP | 1460514 | 9/2004 |
| EP | 1477879 | 11/2004 |
| EP | 1494425 | 1/2005 |
| EP | 1233337 | 8/2005 |
| EP | 1594034 | 4/2010 |
| GB | 2359969 | 9/2001 |
| GB | 2378780 | 2/2003 |
| GB | 2381898 | 5/2003 |
| JP | 02-060859 | 3/1990 |
| JP | H02-291043 | 11/1990 |
| JP | H05/35461 | 2/1993 |
| JP | 05-073580 | 3/1993 |
| JP | H06/035718 | 2/1994 |
| JP | H07/036559 | 2/1995 |
| JP | H07/141153 | 6/1995 |
| JP | H08/006729 | 1/1996 |
| JP | H08-054952 | 2/1996 |
| JP | H09-006880 | 1/1997 |
| JP | H09-069044 | 3/1997 |
| JP | H09/185504 | 7/1997 |
| JP | H09/251494 | 9/1997 |
| JP | 2000/516743 | 3/1998 |
| JP | H11/187013 | 7/1999 |
| JP | 11-219329 | 8/1999 |
| JP | 2000/113066 | 4/2000 |
| JP | 2000/215165 | 8/2000 |
| JP | 2000/293369 | 10/2000 |
| JP | 2000/293439 | 10/2000 |
| JP | 2000/347566 | 12/2000 |
| JP | 2000/357086 | 12/2000 |
| JP | 2001/051742 | 2/2001 |
| JP | 2001/067408 | 3/2001 |
| JP | 2001/101033 | 4/2001 |
| JP | 2001175605 | 6/2001 |
| JP | 2001-184472 | 7/2001 |
| JP | 2001290780 | 10/2001 |
| JP | 2001/312325 | 11/2001 |
| JP | 2001/331229 | 11/2001 |

| | | |
|---|---|---|
| JP | 2001325387 | 11/2001 |
| JP | 2001/338233 | 12/2001 |
| JP | 2001/344437 | 12/2001 |
| JP | 2001/526550 | 12/2001 |
| JP | 2002-072876 | 3/2002 |
| JP | 2002-077149 | 3/2002 |
| JP | 2002/108478 | 4/2002 |
| JP | 2002/108870 | 4/2002 |
| JP | 2002/169719 | 6/2002 |
| JP | 2002-169726 | 6/2002 |
| JP | 2002/182562 | 6/2002 |
| JP | 2002-183352 | 6/2002 |
| JP | 2002164880 | 6/2002 |
| JP | 2002/207426 | 7/2002 |
| JP | 2002/324170 | 11/2002 |
| JP | 2002-374327 | 12/2002 |
| JP | 2003-030150 | 1/2003 |
| JP | 2003/507785 | 2/2003 |
| JP | 2003/510684 | 3/2003 |
| JP | 2003/510713 | 3/2003 |
| JP | 2003/101526 | 4/2003 |
| JP | 2003/140761 | 5/2003 |
| JP | 2003/140762 | 5/2003 |
| JP | 2003/157335 | 5/2003 |
| JP | 2003-173381 | 6/2003 |
| JP | 2003/208314 | 7/2003 |
| JP | 2003/248522 | 9/2003 |
| JP | 2003/296487 | 10/2003 |
| JP | 2003/309545 | 10/2003 |
| JP | 2003/323224 | 11/2003 |
| JP | 2004/054937 | 2/2004 |
| JP | 2004/056794 | 2/2004 |
| JP | 2004/062561 | 2/2004 |
| JP | 2004/062890 | 2/2004 |
| JP | 2004038974 | 2/2004 |
| JP | 2004/102789 | 4/2004 |
| JP | 2004-118327 | 4/2004 |
| JP | 2004/164491 | 6/2004 |
| JP | 2004-295846 | 10/2004 |
| JP | 2004-304755 | 10/2004 |
| JP | 2007/525774 | 9/2007 |
| KR | 20010000805 | 1/2001 |
| KR | 1020020021030 | 3/2002 |
| KR | 20020037453 | 5/2002 |
| KR | 2005/0008439 | 1/2005 |
| KR | 2005/0021782 | 3/2005 |
| NZ | 286668 | 10/1996 |
| RU | 2147790 | 4/2000 |
| WO | WO 93/01550 | 1/1993 |
| WO | WO 96/13013 | 5/1996 |
| WO | WO 96/24092 | 8/1996 |
| WO | WO 96/27155 | 9/1996 |
| WO | WO 97/21162 | 6/1997 |
| WO | WO 97/25798 | 7/1997 |
| WO | WO 97/43761 | 11/1997 |
| WO | WO 98/09209 | 3/1998 |
| WO | WO 98/10381 | 3/1998 |
| WO | WO 98/11478 | 3/1998 |
| WO | WO 98/21679 | 5/1998 |
| WO | WO 98/24037 | 6/1998 |
| WO | WO 98/37481 | 8/1998 |
| WO | WO 98/42098 | 9/1998 |
| WO | WO 98/58306 | 12/1998 |
| WO | WO 99/15970 | 4/1999 |
| WO | WO 99/53689 | 10/1999 |
| WO | WO 0008909 | 2/2000 |
| WO | WO 00/15221 | 3/2000 |
| WO | WO 00/21239 | 4/2000 |
| WO | WO 00/42492 | 7/2000 |
| WO | WO 00/54126 | 9/2000 |
| WO | WO 00/57684 | 10/2000 |
| WO | WO 00/58810 | 10/2000 |
| WO | WO 00/58811 | 10/2000 |
| WO | WO 00/58859 | 10/2000 |
| WO | WO 00/59150 | 10/2000 |
| WO | WO 00/59152 | 10/2000 |
| WO | WO 00/68763 | 11/2000 |
| WO | WO 01/22268 | 3/2001 |
| WO | WO 01/22651 | 3/2001 |
| WO | WO 01/33867 | 5/2001 |
| WO | WO 01/35293 | 5/2001 |
| WO | WO 01/45012 | 6/2001 |
| WO | WO 0144908 | 6/2001 |
| WO | WO 0146783 | 6/2001 |
| WO | WO 01/52020 | 7/2001 |
| WO | WO 01/52021 | 7/2001 |
| WO | WO 01/63512 | 8/2001 |
| WO | WO 01/77795 | 10/2001 |
| WO | WO 01/78303 | 10/2001 |
| WO | WO 01/93461 | 12/2001 |
| WO | WO 02/01335 | 1/2002 |
| WO | WO 02/08969 | 1/2002 |
| WO | WO 02/19598 | 3/2002 |
| WO | WO 02/23315 | 3/2002 |
| WO | WO 02/37371 A1 | 5/2002 |
| WO | WO 02/056155 | 7/2002 |
| WO | 02/073378 | 9/2002 |
| WO | 02/086684 | 10/2002 |
| WO | WO 02/080442 | 10/2002 |
| WO | 02/097693 | 12/2002 |
| WO | WO 02/103495 | 12/2002 |
| WO | WO 03/009115 | 1/2003 |
| WO | WO 03/030434 | 4/2003 |
| WO | WO 03/073688 | 9/2003 |
| WO | WO 03/079269 | 9/2003 |
| WO | WO 03/090101 | 10/2003 |
| WO | WO 03/107585 | 12/2003 |
| WO | WO 03/107588 | 12/2003 |
| WO | WO 2004/023717 | 3/2004 |
| WO | WO 2004/030364 | 4/2004 |
| WO | WO 2004/092886 | 10/2004 |
| WO | WO 2005/109202 | 11/2005 |
| WO | WO 2005/122047 | 12/2005 |
| WO | WO 2006/065012 | 6/2006 |
| WO | WO 2007/032974 | 3/2007 |

OTHER PUBLICATIONS

ODA, "The Basics and Application of Security IC Cards: Passport to an e-business", Apr. 27, 2000.
Hanai, "Latest Information and Establishment of a Server: Setting Up Free BSD", Unix User, Mar. 1, 2002.
Menezes, "Handbook of Applied Cryptography", CRC Press, 1997.
"Free On-Line Dictionary of Computing: 'Concatenate'", Dec. 22, 1995.
Schneier, "Applied Cryptography Second Edition: Protocols, Algorithms, and Source Code in C", 1996, pp. 584-587.
Schneier, "Applied Cryptography Second Edition: Protocols, Algorithms, and Source Code in C", 1996, pp. 183-187.
Schneier, "Applied Cryptography Second Edition: Protocols, Algorithms, and Source Code in C", 1996, pp. 574-577.
Kaplan, "IBM Cryptolopes(™), SuperDistribution and Digital Rights Management", Oct. 1, 1996.
Hong, "On the construction of a powerful distributed authentication server without additional key management", Computer Communications, Feb. 1, 2000.
"Managing Digital Rights in Online Publishing: How two publishing homes maintain control of copyright", Information Management & Technology, Jul. 24, 2001.
Jakobsson, "Proprietary Certificates", Feb. 18, 2002.
Kumik, "Digital Rights Management", C&L, Oct. 2000.
Torrubia, "Cryptography Regulations for E-commerce and Digital Rights Management", Computers & Security, Dec. 1, 2001.
Zwollo, "Digital document delivery and digital rights management", Information Services & Use, Oct. 1, 2001.
EP Partial European Search Report, Application No. 03013556.0, Feb. 20, 2006.
EP Partial European Search Report, Application No. 03013556.0, Oct. 25, 2006.
EP Communication, Application No. 03013556.0, Jun. 6, 2007.
EP Communication, Application No. 03013556.0, Jan. 17, 2011.
JP Official Notice of Rejection, Application No. 2003-183597, Dec. 5, 2008.
JP Official Notice of Final Rejection, Application No. 2003-183597, Apr. 3, 2009.

Evans, "DRM: Is the Road to Adoption Fraught with Potholes?", Seybold Report, Oct. 22, 2001.
Fowler, "Technology's Changing Role in Intellectual Property Rights", IT Pro, IEEE, Mar. 2002.
Gable, "The Digital Rights Conundrum", Transform Magazine, Nov. 2001.
Griswold, "A Method for Protecting Copyright on Networks", Jan. 1994.
Gunter, "Models and Languages for Digital Rights", HICSS-34, IEEE, Jan. 3, 2001.
Hwang, "Protection of Digital Contents on Distributed Multimedia Environment", IASTED, IMSA 2000, Nov. 19, 2000.
Kahn, "Deposit, Registration and Recordation in an Electronic Copyright Management System", Jan. 1994.
Peinado, "Digital Rights Management in a Multimedia Environment", SMPTE Journal, Apr. 2002.
Royan, "Content Creation and Rights Management: Experiences of SCRAN (the Scottish Cultural Resources Access Network)", Apr. 2000.
Välimäki, "Digital Rights Management on Open and Semi-open Networks" WIAPP 2001, Jul. 23, 2001.
Yu, "Digital Multimedia at Home and Content Rights Management", IWNA 2002, IEEE, Jan. 15, 2002.
EP Decision to Refuse, Application No. 03013569.3, Apr. 25, 2007.
JP Notice of Rejection, Application No. 2003-183596, Dec. 1, 2009.
EP Search Report, Application No. 03013557.8, Sep. 17, 2004.
EP Search Report, Application No. 03013557.8, Aug. 2, 2004.
EP Communication, Application No. 03013557.8, Feb. 17, 2005.
EP Communication, Application No. 03013557.8, Dec. 4, 2006.
EP Decision to Refuse, Application No. 03013557.8, Nov. 16, 2009.
JP Notice of Rejection, Application No. 2003-188932, Dec. 8, 2009.
JP Notice of Allowance, Application No. 2003-188932, Mar. 28, 2011.
NO Office Action, Application No. 20032991, Jul. 13, 2011.
NO Search Report, Application No. 20032991, Jul. 13, 2011.
Rouvroy, "Reconfigurable Hardware Solutions for the Digital Rights Management of Digital Cinema", DRM 2004, ACM, Oct. 25, 2004.
JP Notice of Rejection, Application No. 2005-006781, Dec. 3, 2010.
JP Final Rejection, Application 2005-006781, Apr. 22, 2011.
CN First Office Action, Application No. 200510004173.1, Jun. 27, 2008.
CN Second Office Action, Application No. 200510004173.1, Feb. 12, 2010.
Looi, "A Note on Supplying a Trusted Clock via a Secure Device", Computers & Security, Sep. 7, 1994.
Schubert, "Radio Controleld Standard Clock Uses Digital Correlation", Elektronik, 1997. (English language abstract provided).
Takura, "A Secure and Trusted Time Stamping Authority", IWS 1999, IEEE, Feb. 18, 1999.
Housley, "Internet X.509 Public Key Infrastructure Certification and Certificate Revocation List (CRL) Profile", Standards Track, Apr. 2002.
EP Search Report, Ref EP34710RK900kap, for Application No. 05102768.8-2224, Aug. 24, 2006.
EP Communication, Application No. 05102768.8, Mar. 2, 2007.
EP Summons to Attend Oral Proceedings, Application No. 05102768.8, Jul. 17, 2008.
JP Notice of Rejection, Application No. 2005-124814, Dec. 10, 2010.
JP Notice of Allowance, Application No. 2005-124814, Apr. 26, 2011.
AU First Report, Application No. 2005201572, Jan. 15, 2010.
AU Second Report, Application No. 2005201572, Jun. 7, 2010.
AU Notice of Acceptance, Application No. 2005201572, Oct. 14, 2010.
RU Official Action, Application No. 2005112059/09(013957), Apr. 21, 2005.
RU Decision to Grant, Application No. 2005112059/09(013957), Apr. 21, 2005.
MY Adverse Report, Application No. PI20051703, Jun. 27, 2008.
Housley, "Metering: A Prepay Technique", SPIE, Feb. 13, 19997.
Ogata, "Provably Secure Metering Scheme", ASIACRYPT 2000, Dec. 3, 2000.

Kim, "A Secure and Efficient Metering Scheme for Internet Advertising", Apr. 2002.
EP Search Report, Reference Ep 34681TE900dfi, for Application No. 05102765.4, Oct. 13, 2006.
EP Communication, Reference EP 34681TE900dfi, for Application No. 05102765.4, Nov. 19, 2007.
CN First Office Action, Application No. 200510066707.3, Nov. 30, 2007.
AU Notice of Acceptance, Application No. 2005201602, May 7, 2010.
Housley, "Internet X.509 Public Key Infrastructure Certificate and Certificate Revocation List (CRL) Profile", Standards Track, Apr. 2002.
"Aladdin Knowledge Systems Partners with Rights Exchange, Inc. to Develop a Comprehensive Solution for Electronic Software Distribution", Business Wire, Aug. 3, 1998.
Armati, "Tools and Standards for Protection, Control and Presentation of Data", Apr. 3, 1996.
Benjamin, "Electronic Markets and Virtual Value Chains on the Information Superhighway", Sloan Management Review, Jan. 15, 1995.
Cassidy, "A Web Developer's Guide to Content Encapsulation Technology", Apr. 1997.
Cox, "Superdistribution", Wired, Sep. 1994.
Cox, "What If There is a Silver Bullet", Joop, Jun. 1992.
Hauser, "Does Licensing Require New Access Control Techniques?", Aug. 12, 1993.
Hudgins-Bonafield, "Selling Knowledge on the Net", Network Computing, Jun. 1, 1995.
"IBM Spearheading Intellectual Property Protection Technology for Information on the Internet; Cryptolope Containers Have Arrived", Business Wire, May 1, 1996.
"Technological Solutions Rise to Complement Law's Small Stick Guarding Electronic Works", Information Law Alert, Jun. 16, 1995.
Kent, "Protecting Externally Supplied Software in Small Computers", MIT, Sep. 1980.
Kohl, "Safeguarding Digital Library Contents and Users; Protecting Documents Rather Than Channels", D-Lib Magazine, Sep. 1997.
Linn, "Copyright and Information Services in the Context of the National Research and Education Network", Jan. 1994.
McNab, "Super-Distribution Works Better in Practical Applications", Computer Dealer News, Mar. 2, 1998.
Moeller, "NetTrust Lets Cyberspace Merchants Take Account", PC Week, Nov. 20, 1995.
Moeller, "IBM Takes Charge of E-commerce; Plans Client, Server Apps Based on SET", PC Week, Apr. 29, 1996.
Pemberton, "An ONLINE Interview with Jeff Crigler at IBM Infomarket", Online, Jul. 1996.
"LicensIt: Kinder, Gentler Copyright? Copyright Management System Links Content, Authorship Information", Seybold, Jul. 1996.
Sibert, "DigiBox: A Self-Protecting Container for Information Commerce", USENIX, Jul. 11, 1995.
Sibert, "Securing the Content, Not the Wire, for Information Commerce", Jul. 1995.
Stefik, "Trusted Systems", Scientific American, Mar. 1997.
Stefik, "Shifting the Possible: How Trusted Systems and Digital Property Rights Challenge Us to Rethink Digital Publishing", Berkeley Technical Law Journal, 1997.
"Rights Management in the Digital Age: Trading in Bits, Not Atoms", YBP, Oct. 15, 1997.
Weber, "Digital Right Management Technologies", IFRRO, Oct. 1995.
White, "ABYSS: An Architecture for Software Protection", IEEE, Jun. 1990.
White, "ABYSS: A Trusted Architecture for Software Protection", IEEE, Apr. 27, 1987.
Ramanujapuram, "Digital Content & Intellectual Property Rights: A Specification Language and Tools for Rights Management", Dr. Dobbs Journal, Dec. 1998.
Support FAQ, "Optimising License Checkouts from a Floating License Server", ARM, Feb. 13, 2004.
Thompson, "Digital Licensing", IEEE, Jul. 2005.
Olson, "Concurrent Access Licensing", UNIX Review, 1988.

"Finland—Data Fellows Secures ICSA Certification", Newsbytes, Jan. 7, 1998.
"Black Box Crypton Defies the Hackers", Electronics Weekly, Mar. 6, 1985.
"Solution for Piracy", Which Computer, Nov. 1983.
"Sony Develops Copyright Protection Solutions for Digital Music Content", PR Newswire, Feb. 25, 1999.
"BreakerTech Joins Copyright Management Market", ComputerWire, Aug. 4, 1999.
"Aladdin Acquires the Assets of Micro Macro Technologies", Business Wire, Mar. 3, 1999.
Lampson, "Authentication in Distributed Systems: Theory and Practice", ACM, TOCS, Nov. 4, 1992.
International Search Report and Written Opinion, Application No. PCT/US2006/034622, Jan. 16, 2006.
EP Supplementary Search Report, Reference FB18699, Application No. 05820177.3-2212/PCT/US2005040949, Nov. 19, 2010.
EP Communication, Reference EP36952RK900peu, Application No. 05109616.2-1243, May 26, 2008.
CN Division of Application, Application No. 200510113398.0, Aug. 8, 2008.
CN First Office Action, Application No. 200510113398.0, Dec. 12, 2008.
CN Second Office Action, Application No. 200510113398.0, Jul. 3, 2009.
CN Proceeding with the Registration Formalities, Application No. 200510113398.0, Oct. 23, 2009.
AU Examiner's First Report, Application No. 2005222507, Jun. 4, 2010.
AU Notice of Acceptance, Application No. 2005222507, Oct. 14, 2010.
RU Decision on Grant of a Patent for Invention, Application No. 2005131911/09(035772), Mar. 1, 2010.
"TCG Specification Architecture Overview", Revision 1.2, TCG, Apr. 28, 2004.
International Search Report and Written Opinion, Application No. PCT/US05/46091, Jun. 19, 2007.
CN Grant of Patent Right, Application No. 200580040764.2, Jan. 29, 2010.
International Search Report, Application No. PCT/US2006/032708, Jan. 5, 2007.
"CyoLicence", Version 1.3.0, Released Mar. 5, 2005, cyotec.com, Printed Sep. 7, 2005.
"Magic Desktop Automation Suite for the Small and Mid-Sized Business", Version 8.1.10, Copyright 2005, remedy.com, Printed Sep. 7, 2005.
"PACE Anti-Piracy Introduction", Copyright 2002, paceap.com, Printed Sep. 7, 2005.
MX Office Action, Application No. MX/a/2007/005661, Jul. 6, 2009.
MX Office Action, Application No. MX/a/2007/005661, Oct. 1, 2010.
MX Office Action, Application No. MX/a/2007/005661, Mar. 8, 2011.
CN Second Office Action, Application No. 200680030846.3, Jun. 7, 2010.
CN Decision on Rejection, Application No. 200680030846.3, Sep. 13, 2010.
International Search Report and Written Opinion, Application No. PCT/US05/46223, Mar. 21, 2007.
CN First Office Action, Application No. 200580043102.0, Oct. 9, 2009.
International Search and Written Opinion, Application No. PCT/US05/46539, Jul. 9, 2008.
CN First Office Action, Application No. 200580044294.7, Dec. 29, 2010.
MX Office Action, Application No. MX/a/2007/007441, Jul. 1, 2009.
EP Supplementary Search Report, Reference FB18817, Application No. 05855148.2-2212/1839261PCT/US2005046539, Aug. 31, 2011.
International Search Report and Written Opinion, Application No. PCT/US06/12811, Sep. 25, 2007.
AU Examiner's First Report, Application No. 2006220489, Sep. 15, 2009.
AU Notice of Acceptance, Application No. 2006220489, Jan. 25, 2010.
CN First Office Action, Application No. 200680006199.2, Aug. 22, 2008.
CN Second Office Action, Application No. 200680006199.2, Feb. 20, 2009.
CN Fourth Office Action, Application No. 200680006199.2, Jan. 8, 2010.
CN Fifth Office Action, Application No. 200680006199.2, Jul. 14, 2010.
CN Grant of Patent Right, Application No. 200680006199.2, Oct. 20, 2010.
CN First Office Action, Application No. 200680030846.3, Aug. 21, 2009.
CN First Office Action, Application No. 200510127170.7, Dec. 11, 2009.
JP Notice of Rejection, Application No. 2005-330496, Jun. 21, 2011.
CN Third Office Action, Application No. 200680006199.2, Jun. 5, 2009.
International Search Report and Written Opinion, Application No. PCT/US05/40940, Sep. 29, 2009.
International Search Report and Written Opinion, Application No. PCT/US05/40949, Sep. 25, 2006.
EP Communication, Reference EP37340RK900kja, Application No. 05110697.9-2221, Nov. 17, 2006.
EP Communication, Reference EP37340RK900kja, Application No. 05110697.9-2221, Apr. 5, 2007.
EP Summons to Attend Oral Proceedings, Reference EP37340RK900kja, Application No. 05110697.9-2221, Sep. 27, 2007.
EP Decision to Refuse, Reference EP37340RK900kja, Application No. 05110697.9-2221, Feb. 15, 2008.
International Search Report and Written Opinion, Application No. PCT/US05/040942, Sep. 8, 2006.
MX Office Action, Application No. MX/a/2007/005657, Jun. 29, 2009.
EP Supplementary Search Report, Reference FB18696, Application No. 05820090.8-2221PCT/US2005040965, Jan. 11, 2008.
EP Communication, Reference FB18696, Application No. 05820090.8-2221, Mar. 5, 2008.
CN First Office Action, Application No. 200580038813.9, Apr. 11, 2008.
MX Office Action, Application No. MX/a/2007/005656, Jun. 29, 2009.
MX Office Action, Application No. MX/a/2007/005659, Nov. 30, 2009.
CN Second Office Action, Application No. 200580038812.4, Dec. 18, 2009.
CN Third Office Action, Application No. 200580038812.4, Apr. 1, 2010.
CN Grant of Patent Right, Application No. 200580038812.4, Apr. 5, 2011.
CN First Office Action, Application No. 200580038745.6, Sep. 27, 2010.
MX Office Action, Application No. MX/a/2007/005662, Jul. 8, 2009.
EP Invitation, Reference FB18700, Application No. 05821183.0-2212, Jul. 23, 2010.
EP Supplemental Search Report, Ref. FB18700, for Application No. 05821183.0-2212/1815641PCT/US2005040966, Jan. 7, 2011.
CN Proceeding with the Registration Formalities, Application No. 200580038773.8, Dec. 25, 2009.
MX Office Action, Application No. MX/a/2007/005655, Jun. 26, 2009.
MX Office Action, Application No. MX/a/2007/005655, Feb. 9, 2010.
MX Office Action, Application No. MX/a/2007/, Sep. 24, 2010.
EP Extended Search Report, Reference FB, Application No. 05819896.1-2212/PCT/US2005040940, Jan. 21, 2010.
EP Communication, Reference FB18695, Application No. 05819896.1-2212/1815639, Mar. 19, 2010.
MX Office Action, Application No. MX/a/2007/005656, Feb. 10, 2010.

MX Office Action, Application No. MX/a/2007/005656, Oct. 18, 2010.
CN First Office Action, Application No. 200680033207.2, Jul. 30, 2010.
EP Search Report, Reference EP36952RK900peu, Application No. 05109616.2-1243, Jan. 2, 2008.
"Flonix:USB Desktop OS Solutions Provider", Copyright 2004, flonix.com, Printed Jun. 1, 2005.
"Migo Features: Migo Transofrms Any PC into Your PC", Powerhouse Technologies Group, Copyright 2005, 4migo.com, Printed Jun. 1, 2005.
"WebServUSB Quick Start", ItWorks, Copyright 2004, webservusb.com, Printed Jun. 1, 2005.
JP Notice of Rejection, Application No. 2007-541363, Jul. 28, 2011.
JP Notice of Rejection, Application No. 2007-552142, Aug. 5, 2011.
JP Notice of Rejection, Application No. 2007-548385, Sep. 9, 2011.
"DMOD WorkSpace OEM Unique Features", Copyright 2003, dmod.com, Printed Jan. 12, 2005.
EP Supplementary Search Report, Reference EP35528RK900kja, for Application No. 04779484.7-2212/1620803PCT/US2004024439, Feb. 8, 2010.
EP Communication, Reference EP35528RK900kja, for Application No. 04779484.7-2212, Apr. 14, 2010.
AU First Report, Ref. 12625470/DBW, for Application No. 2004288593, Jan. 22, 2010.
International Search Report, Application No. PCT/US04/24439, Sep. 6, 2006.
Stallings, "Network and Internetwork Security: Principles and Practice", Prentice Hall, Jan. 1995.
"WDM Audio Design Considerations", Copyright 2004, intelligraphics.com, Intelligraphics Device Drivers, Printed Apr. 15, 2005.
"Features of Windows Media DRM", Copyright 2005, microsoft.com, Windows Media, Printed Apr. 15, 2005.
AU Examination Response, Application No. 2004200461, Aug. 21, 2009.
AU First Report, Application No. 2004200461, May 22, 2009.
AU Notice of Acceptance, Application No. 2004200471, Nov. 12, 2009.
AU Notice of Acceptance, Application No. 2004200461, Sep. 4, 2009.
AU Examiner's First Report, Application No. 2004200471, Aug. 27, 2009.
CN First Office Action, Application No. 200410007610.0, Feb. 6, 2009.
CN First Office Action, Application No. 200410005380.4, Feb. 6, 2009.
CN Grant of Patent Right for Invention, Application No. 200410005380.4, Jul. 24, 2009.
CN First Office Action, Application No. 200910139429.8, Nov. 23, 2011.
"Digital Media Solutions: Secure Streaming", Copyright 2005, OmniWeb, Printed May 26, 2005.
EP Communication, Reference EP27627-034/Peu, Application No. 03013569.3-2212, Feb. 17, 2005.
EP Communication, Reference EP27627/Peu, Application No. 03013569.3-2212, Feb. 15, 2006.
EP Communication, Reference EP27628-034/Peu, Application No. 03013556-2212, Jan. 17, 2011.
EP Communication, Reference EP29878RK900peu, Application No. 04003033.0-2122, Jun. 8, 2006.
EP Communication, Reference EP27628-034/Peu, Application No. 03013556.0-2112, Jun. 6, 2007.
EP Communication, Reference EP29730RK900peu, Application No. 04001954.9-2221, Mar. 18, 2005.
EP Decisio to Refuse, Reference EP29730RK900peu, Application No. 04001954.9-2221, Apr. 4, 2006.
EP Partial Search Report, Reference EP27628-034/Peu, Application No. 03013556.0-2224, Feb. 20, 2006.
EP Declaration, Reference EP29703RK900peu, Application No. 04001954.9, Jul. 27, 2004.
EP Search Report, Reference EP27627-037/Peu, Application No. 03013569.3-2212, Aug. 2, 2004.
EP Partial Search Report, Reference EP27628-034/Peu, Application No. 03013556.0-2212, Oct. 25, 2006.
EP Search Report, Reference EP29878RK900peu, Application No. 04003033.3-2212PCT/, Sep. 26, 2005.
EP Summons to Attend Oral Proceedings, Reference EP29730RK900peu, Application No. 04001954.9-2221, Oct. 4, 2005.
"How Windows Rights Management Works (Illustration)", Direcions on Microsoft, Mar. 17, 2003.
IN First Examination Report, Application No. 167/MUM/2004, Aug. 30, 2011.
JP Amendment, Application No. 2003-183597, Mar. 5, 2009.
JP Final Rejection, Application No. 2004-035810, Sep. 21, 2010.
JP Notice of Allowance, Application No. 2003-183596, May 13, 2011.
JP Notice of Allowance, Application No. 2004-050478, Oct. 22, 2010.
JP Notice of Allowance, Application No. 2003-183597, Oct. 30, 2009.
JP Notice of Rejection, Application No. 2003-183596, Dec. 10, 2010.
JP Notice of Rejection, Application No. 2004-035810, Jun. 1, 2010.
JP Notice of Rejection, Application No. 2004-050478, May 28, 2010.
JP Notice of Rejection, Application No. 2004-050478, Sep. 17, 2010.
JP Notice of Rejection, Application No. 2003-183597, Dec. 5, 2008.
Kingston, "Manage Digital Rights with the OMA: The Open Mobile Alliance is Setting the Standard for Quality Mobile Content", IBM, Jul. 27, 2004.
"RealNetworks Announces Helix DRM—The First Major Digital Rights Management Platform for Both Standards-Based and Internet Formats", Real, Jan. 9, 2003.
Rosoff, "Rights Management Comes to the Enterprise: Rights Management Beyond Digital Media", Directions on Microsoft, Mar. 17, 2003.
RU Official Action, Application No. 2004103872/09(004140), Dec. 12, 2007.
TW Notice of Allowance, Application No. 93104488, Jul. 28, 2010.
CA Office Action, Application No. 2505295, Mar. 29, 2012.
Adams, "Internet X.509 Public Key Infrastructure Certificate Management Protocols", IETF, Network Working Group, Mar. 1999.
Arsenault, "InternetX.509 Public Key Infrastructure Roadmap", IETF, PKIX Working Group, Jul. 2002.
AU First Report, Application No. 2005201602, Jan. 14, 2010.
AU First Report, Application No. 2004200454, May 26, 2009.
AU First Report, Application No. 2004200468, Sep. 2, 2009.
AU Notice of Acceptance, Application No. 2004200468, Dec. 16, 2009.
CN First Office Action, Application No. 200680025291.3, Mar. 8, 2010.
CN First Office Action, Application No. 200410005381.9, Apr. 17, 2009.
CN First Office Action, Application No. 200410033028.1, Apr. 6, 2007.
CN First Office Action, Application No. 200480011309.5, Jan. 16, 2009.
CN Grant of Patent Right for Invention, Application No. 200410033028.1, Jan. 15, 2010.
CN Grant of Patent Right for Invention, Application No. 200410005381.9, Mar. 12, 2010.
CN Grant of Patent Right for Invention, Application No. 200680025291.3, Mar. 17, 2011.
CN Grant of Patent Right for Invention, Application No. 200510065993.1, Oct. 16, 2009.
CN Grant of Patent Right for Invention, Application No. 200510004173.1, Sep. 27, 2011.
CN Grant of Patent Right to Invention, Application No. 200510066707.3, Aug. 8, 2008.
CN Grant of Patent Right for Invention, Application No. 200480011309.5, Sep. 23, 2011.
CN Second Office Action, Application No. 200410033028.1, Aug. 28, 2009.
CN Second Office Action, Application No. 200410005381.9, Sep. 18, 2009.

CN Second Office Action, Application No. 200680025291.3, Nov. 5, 2010.
Curet, "RTP Payload Format for MPEG-4 FlexMultiplexed Streams", IETF, Nov. 8, 2001.
EP Invitation, Reference EP29948TE900kap, Application No. 04003418.3-2212, Mar. 6, 2006.
EP Communcation, Reference EP29948TE900kap, Application No. 04003418.3-2212, Dec. 17, 2004.
EP Communication, Reference EP27759-034/Peu, Application No. 03013557.8-2212, Feb. 15, 2006.
EP Communication, Reference EP29948TE900kap, Application No. 04003418.3-2212, Sep. 19, 2005.
EP Communication, Reference EP29728RK900peu, Application No. 04001953.1-2212, Aug. 25, 2006.
EP Communication, Reference EP22128-034/kg, Application No. 00913629.2-1238, Oct. 14, 2008.
EP Communication, Reference EP22129-034/dp, Application No. 00915912.0-1238, Oct. 15, 2008.
EP Decision to Grant, Reference EP29278RK900peu, Application No. 04001953.1-2212/1452941, Feb. 19, 2009.
EP Decision to Grant, Reference EP29948TE900kap, Application No. 04003418.3-2212/1455479, Sep. 13, 2007.
EP Decision to Grant, Reference EP34710RK900kap, Application No. 05102768.8-1245/1594034, Mar. 11, 2010.
EP Search Report and Written Opinion, PCT/US2006/031185, Jan. 16, 2007.
EP Search Report, Reference EP29948TE900kap, Application No. 04003418.3-2212, Jul. 20, 2004.
EP Search Report, Reference EP29728RK900peu, Application No. 04001953.1-2212 PCT, Aug. 2, 2005.
EP Search Report, Reference EP34710RK900kap, Application No. 05102769.8-2224, Aug. 24, 2006.
EP Search Report, Reference EP33027RK900kap, Application No. 05101183.1-1243/1571524, Mar. 23, 2012.
International Search report, PCT/US04/24439, mailed Sep. 6, 2006, (App. No. EP 04779484.7; Pub. No. EP1620803).
International Search report, PCT/US06/26913, mailed Sep. 18, 2007, (App. No. EP 06774628.9; Pub. No. EP 1902538).
International Search report, PCT/US00/05091, mailed Jul. 26, 2002, (App. No. EP 00915912.0; Pub No. EP 1259863).
EP Summons to Attend Oral Proceedings, Reference EP27759-034/Peu, Application No. 03013557.8-2212/1378812, May 13, 2009.
EP Supplementary Search Report, Reference EP35528RK900kja, Application No. 04779484.7-2212/1620803PCT/US2004024439, Feb. 8, 2010.
Handley, "SDP: Session Description Protocol", The Internet Society, Apr. 1998.
IN First Examination Report, Application No. 136/MUM/2004, Jul. 27, 2011.
ID Results of Substantive Examination, Application No. P-00 2004 00074, Dec. 19, 2007.
International Preliminary Examination Report, Reference MSFT-0156, Application No. PCT/US00/04946, Received Oct. 30, 2002.
International Preliminary Examination Report, Reference MSFT-0150, Application No. PCT/US00/04947, Received Sep. 2, 2002.
International Preliminary Examination Report, Reference MSFT-0151, Application No. PCT/US00/04948, Received Oct. 29, 2002.
International Preliminary Examination Report, Reference MSFT-0152, Application No. PCT/US00/04949, Received Oct. 30, 2002.
International Preliminary Examination Report, Reference MSFT-0153, Application No. PCT/US00/04972, Received Sep. 11, 2002.
International Preliminary Examination Report, Reference MSFT-0154, Application No. PCT/US00/04983, Received Nov. 7, 2002.
International Preliminary Examination Report, Reference MSFT-0155, Application No. PCT/US00/05091, Received Dec. 9, 2002.
International Preliminary Examination Report, Reference MSFT-4466, Application No. PCT/US2004/024439, Nov. 1, 2006.
International Preliminary Examination Report, Reference 313748.02, Application No. PCT/US2006/026913, Jan. 16, 2008.
International Search Report, Application No. PCT/US00/04949, Jul. 22, 2002.
International Search Report, Application No. PCT/US00/04946, Jul. 24, 2002.
International Search Report, Application No. PCT/US00/04948, Jul. 24, 2002.
International Search Report, Application No. PCT/US00/05091, Jul. 26, 2002.
International Search Report, Application No. PCT/US00/04983, Jul. 30, 2002.
International Search Report, Application No. PCT/US06/26913, Sep. 18, 2007.
Klemets, "RTP Payload Format for Video Codec 1 (VC-1)", The Internet Society, Feb. 2006.
Maurer, "Modeling a Public-Key Infrastructure", ETH, Sep. 1996.
Myers, "Certificate Management Messages over CMS", The Internet Society, Apr. 2000.
Myers, "Internet X.509 Certificate Request Message Format", The Internet Society, Mar. 1999.
Nafaa, "RTP4MUX: A Novel MPEG-4 RTP Payload For Multicast Video Communications Over Wireless IP", Mar. 22, 2004.
"Proposed SMPTE Standard for Television: VC-1 Compressed Video Bitstream Format and Decoding Process", SMPTE, Aug. 23, 2005.
Gentric, "RTP Payload Format for MPEG-4 Streams", IETF, Jul. 2001.
Schulzrinne, "RTP: A Transport Protocol for Real-Time Applications", The Internet Society, Jul. 2003.
Schulzrinne, "RTP Profile for Audio and Video Conferences with Minimal Control", Networking Group, Jan. 1996.
SMPTE Standard for Television, Audio and Film—Time and Control Code, SMPTE, Sep. 12, 1995.
"Information Technology—Open Systems Interconnection—The Directory: Public-Key and Attribute Certificate Frameworks", ITU-T, Mar. 2000.
"A Technical Overview of Windows Media DRM 10 for Devices", Windows Media, Microsoft, Sep. 2004.
Kim, "Design and Implementation of MPEG-2/DVB Scrambler Unit and VLSI Chip", IEEE, Aug. 1997.
Written Opinion of the International Searching Authority, Reference MSFT-4466, Application No. PCT/US04/24439, Apr. 29, 2006.
Written Opinion of the International Search Authority, Reference 313748.02, Application No. PCT/US06/26913, Jan. 16, 2008.
"Achieving Peak Performance: Insights from a Global Survey on Credit Risk and Collections Practices", White Paper, GCI Group Inc, Jan. 2004.
Arbaugh, "A Secure and Reliable Bootstrap Architecture", IEEE, May 1997.
Backman, "Smartcards: The Intelligent Way To Security", Network Computing, May 15, 1998.
Bajikar, "Trusted Platform Module (TPM) based Security on Notebook PCs—White Paper", Intel Corporation, Jun. 20, 2002.
"Content Protection System Architecture: A Comprehensive Framework for Content Protection", Intel Corporation, Feb. 17, 2000.
Davida, "UNIX Guardians: Active User Intervention in Data Protection", IEEE, Dec. 12, 1988.
"DMOD WorkSpace OEM Unique Features", dmod.com, Printed Jan. 12, 2005.
EP Communication, Reference EP36952RK900peu, Application No. 05109616.2-1243, Mar. 8, 2012.
"Equifax Business Solutions: Manage Your Customers", equifax.com, Printed Oct. 14, 2005.
Eren, "Fringe-Effect Capacitive Proximity Sensors for Tamper Proof Enclosures", IEEE, Feb. 8, 2005.
JP Final Rejection, Application No. 2007-552142, Jan. 17, 2012.
Gao, "Online Advertising: Taxonomy and Engineering Perspectives", engr.sjsu.edu, Jan. 11, 2002.
Goering, "Web Venture Offers Metered Access to EDA Packages—Startup Winds Clocks By-the-Hour Tools (e*ECAD Will Launch Web Site That Provides Pay-Per-Use and Pay-Per-Hour Access to Range of Chip Design Software)", Electronic Engineering Times, Nov. 6, 2000.
PCT International Search Report and Written Opinion, Application No. PCT/US05/40950, Nov. 30, 2006.
PCT International Search Report and Written Opinion, Application No. PCT/US2007/087960, Apr. 22, 2008.
PCT Written Opinion, Application No. PCT/US05/40967, Nov. 8, 2007.

Kaliski, "Privacy Enhancement for Internet Electronic Mail: Part IV: Key Certification and Related Services", Network Working Group, Feb. 1993.
Shen, "A new Digital Watermarking Technique for Video", ACM, Visual '02, Nov. 13, 2002.
Kwok, "Digital Rights Management for the Online Music Business", ACM, Aug. 2002.
Linn, "Privacy Enhancement for Internet Electronic Mail: Part I: Message Encryption and Authentication Procedures", Network Working Group, Feb. 1993.
Lotspiech, "Broadcast Encryption's Bright Future", IEEE Computer, Aug. 2002.
Memon, "Protecting Digital Media Content", Communications of the ACM, Jul. 1998.
Morales, "Understanding Your Credit Score", CBS News, Apr. 30, 2003.
Mufti, "Design and Implementation of a Secure Mobile IP Protocol", IEEE, Jun. 11, 2004.
Oh, "Acceleration Technique For Volume Rendering Using 2D Tecture Based Ray Plane Casting on GPU", IEEE, Nov. 3, 2006.
Oshiba, "Personalized Advertisement-Duration Control for Streaming Delivery", ACM, Multimedia '02, Dec. 1, 2002.
PCT International Search Report and Written Opinion, Application No. PCT/US05/30490, Sep. 18, 2007.
"Prequalification Using Credit Reports", First American CREDCO, credco.com, Printed Oct. 14, 2005.
Pruneda, "Windows Media Technologies: Using Windows Media Rights Manager to Protect and Distribute Digital Media", Microsoft, MSDN Magazine, Dec. 2001.
Qiao, "MiSer: An Optimal Low-Energy Transmission Strategy for IEEE 802.11 a/h", ACM, MobiCom '03, Sep. 14, 2003.
Ripley, "Content Protection in the Digital Home", Intel Technology Journal, Nov. 2002.
Shi, "A Fast MPEG Video Encryption Algorithm", AMC, Multimedia '98, Sep. 12, 1998.
Slusallek, "Vision—An Architecture for Global Illumination Calculation", IEEE, Mar. 1995.
Yue, "The Reward Based Online Shopping Community", Routledge, Oct. 1, 2000.
Zemao, "A Malicious Code Immune Model Based on Program Encryption ", Oct. 12, 2008.
Zhao, "A New Watermarking Scheme for CAD Engineering Drawings", IEEE, Nov. 22, 2008.
"How to Prevent Copying DB Application to Other Machines", Discussion from microsoft.public.access.security, Dec. 22, 1998.
Malamud, "Network-Based Authentication: The Key to Security", Network Computing, Jun. 1991.
"Postal Service Announces Plan to Put Postmarks on Electronic Mail", San Jose Mercury News, Apr. 9, 1995.
Ahuja, "The Key to Keys", Dataquest, Aug. 31, 1997.
Smith, "A New Set of Rules For Information Commerce", CommunicationsWeek, Nov. 6, 1995.
"Bankard Set to Into Virtual Shopping in Philippines", Newsbytes News Network, DowJones Factiva, Apr. 16, 1997.
Amdur, "InterTrust Challenges IBM Digital Content Metering: Funding, Name Change, Developer Kit Kick Off Aggressive Market Push", Report on Electronic Commerce, Jul. 23, 1996.
Chin, "Reaching Out to Physicians", Health Data Management, Sep. 1998.
Clark, "Software Secures Digital Content on Web", InteractiveWeek, Sep. 25, 1995.
Finnie, "Suppliers Cashing in on the Internet", CommunicationsWeek International, DowJones Factiva, Nov. 14, 1994.
Tarter, "The Superdistribution Model", Soft-Letter, Nov. 15, 1996.
Blissmer, "Next Step is Encryption: Data Security May be Bundled with Next's Operating System", Electronic Engineering Times, Feb. 3, 1992.
CN Second Office Action, Application No. 200810189719.9, Apr. 2, 2011.
CN Second Office Action, Application No. 200810189718.4, Apr. 13, 2011.

"Cylink: Public-Key Security Technology Granted to the Public; Cylink Announces the Reowned Diffie-Hellman Public-Key Technology Has Entered the Public Domain", Business Wire, Sep. 16, 1997.
Dawson, "S-A Unveil Security System", BroadbandWeek, Jan. 15, 1996.
"Internet Dynamics: Internet Dynamics First to Ship Integrated Security Solution for Enterprise Intranets and Extranets; Conclave Accelerates Enterprise Deployment of Secure, High-Value Intranets and Extranets", Business Wire, Sep. 15, 1997.
JP Notice of Rejection, Application No. 2005-301957, Nov. 11, 2011.
Kopeikin, "Secure Trading on the Net", Telecommunications, Oct. 1996.
PCT International Search Report and Written Opinion, Application No. PCT/US05/40966, Jul. 24, 2008.
Steinbach, "Digital Watermarking: Basics—Applications—Limits", Information, Jul. 2002.
Stevens, "How Secure is Your Computer Systems?", The Practical Accountant, Jan. 1998.
PCT International Search Report and Written Opinion for Application No. PCT/US05/40965, Apr. 25, 2007.
MX Office action for Application No. MX/a/2007/005660, Jul. 7, 2009.
EP Communication for Application No. 05823253.9-2212/1815322 PCT/US2005040942, Reference FB18697, Aug. 13, 2010.
"Forward Solutions Unveils Industry's Most Advanced Portable Personal Computing System on USB Flash Memory Device", PR Newswire, Sep. 22, 2003.
EP Communication for Application No. 05854752.2-1245/1829274 PCT/US2005046091, Reference FB18701, Dec. 21, 2011.
EP Communication for application No. 05851550.3-1243/1825391 PCT/US2005040967, Reference FB18698, Jul. 5, 2012.
KR Preliminary Rejection for Application No. 10-2007-7012294, Reference 310476.07, Jul. 4, 2012.
JP Notice of Rejection for Application No. 2005-301957, Jun. 8, 2012.
Nakajima, "Do You Really Know It? Basics of Windows2000/XP, Network, 4th Installment, What Is Logon Like?, "Nikkei Windows for IT professionals, Nikkei Business Publications, Inc., Jan. 1, 2004.
"First Special Feature, Security-oriented Web Application Development, Part 3, Method for Realizing Secure Session Management,"N+I Network Guide, Softbank Publishing Inc., Jan. 1, 2004.
Utagawa, "Creation of Card Application by IC Card OS 'MULTOS'Which Can Rewrite Application", Interface, Mar. 1, 2003.
EP Communication for Application No. 12002881.6-2212, Reference EP35528IPM232vt, Jul. 10, 2012.
JP Final Rejection for Application No. 2000-608539, Dec. 24, 2009.
Amdur, "Metering Online Copyright," Jan. 16, 1996.
"Boxing Up Bytes", No publication date available. This reference was cited in U.S. Appl. No. 09/892,371 on Mar. 22, 2002.
Misra, "Tamper Detection Using Neuro-Fuzzy Logic," Ninth International Conference on Metering and Tariffs for Energy Supply, May 25-28, 1999.
MS to Upgrade Browser Security, Cnet News.com, Mar. 20, 1997.
The New Network: Planning and Protecting Intranet Electronic Commerce, Information Week, Dec. 2, 1996.
JP Notice of Rejection for Application No. 2004-050480, Feb. 9, 2010.
JP Notice of Allowance for Application No. 2004-050480, May 20, 2010.
MY Substantive Examination for Application No. PI20040481, Apr. 23, 2008.
MY Substantive Examination for Application No. PI20040481, Sep. 30, 2011.
MY Substantive Examination for Application No. PI20051703, Oct. 2, 2009.
MY Substantive Examination for Application No. PI20051703, May 14, 2010.
PL Notice for Application No. P365549/DP, Jan. 26, 2009.
PL Notice for Application No. P365549/DP, Sep. 9, 2009.
PH Office Action for Application No. 1-2004-000078, Oct. 26, 2007.

RU Official Action for Application No. 2004105509, Jan. 25, 2008.
RU Decision on Grant for Application No. 2004105509, Jul. 24, 2008.
RU Official Action for Application No. 2004103871, Mar. 5, 2008.
RU Decision On Grant for Application No. 2004103871, Jun. 27, 2008.
RU Official Action for Application No. 2005112059, Apr. 22, 2009.
RU Decision on Grant for Application No. 2005112059, Jul. 16, 2009.
RU Decision on Grant for Application No. 2005112105, Mar. 16, 2009.
RU Report on Examination Results for Application No. 2005120671, Aug. 13, 2008.
RU Decision on Grant for Application No. 2008101456, Oct. 4, 2010.
JP Notice of Rejection for Application No. 2004-035808, Feb. 12, 2010.
JP Notice of Rejection for Application No. 2004-035808, Jul. 23, 2010.
JP Notice of Allowance for Application No. 2004-035808, Nov. 2, 2010.
JP Written Appeal for Application No. 2005-006781, filed on Aug. 22, 2011.
JP Notice of Allowance for Application No. 2005-006781, Oct. 7, 2011.
JP Notice of Rejection for Application No. 2008-521533, May 20, 2011.
JP Notice of Allowance for Application No. 2008-521533, Oct. 14, 2011.
EP Communication for Application No. 12 002 881.6-1956, Reference EP35528IPM232vt, Feb. 18, 2013.
EP Communication for Application No. 12 002 880.8-1956, Reference EP35528IIPM232v, Feb. 18, 2013.

* cited by examiner

SECURE CLOCK WITH GRACE PERIODS

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples in connection with the examples illustrated. However, the same or equivalent functions and sequences may be accomplished by different examples.

The examples described are directed to a Digital Rights Management (DRM) system operating with time based licenses that may support content rental, subscription models and previews. This type of DRM system may utilize a "secure clock" service, and a "grace period" that may allow media to be played in the event the secure clock interruption that may not be reset immediately. This type of DRM system typically includes one or more CE devices.

Although the present examples are described and illustrated as being implemented in a consumer electronics ("CE") device system, the system described is provided as an example and not a limitation. CE devices may include pocket PCs, set top boxes, portable media centers, cell phones, music players, PCs, software constructed media players, high fidelity components, and the like. In fact PCs are a common device that may be provided with DRM enabling software to function as a CE device. In addition PCs may be equipped with software applications that can also operate in conjunction with grace period. PCs may be used as docking stations for a user to store content on, and then download some or all of it to another CE device, such as an MP3 player. These CE devices are typically configured to operate in a system that includes the internet, PCs and the like to facilitate license and media content transfer.

A typical licensing system is a digital rights management ("DRM") system. As those skilled in the art will appreciate, the present example is suitable for application in a variety of different types of systems that operate under a license. The use of grace periods may be useful in the management of licensed content for these types of systems, and in particular systems that include a secure clock that tends to prevent tampering with the time based license by setting the clock back.

Figure 1:
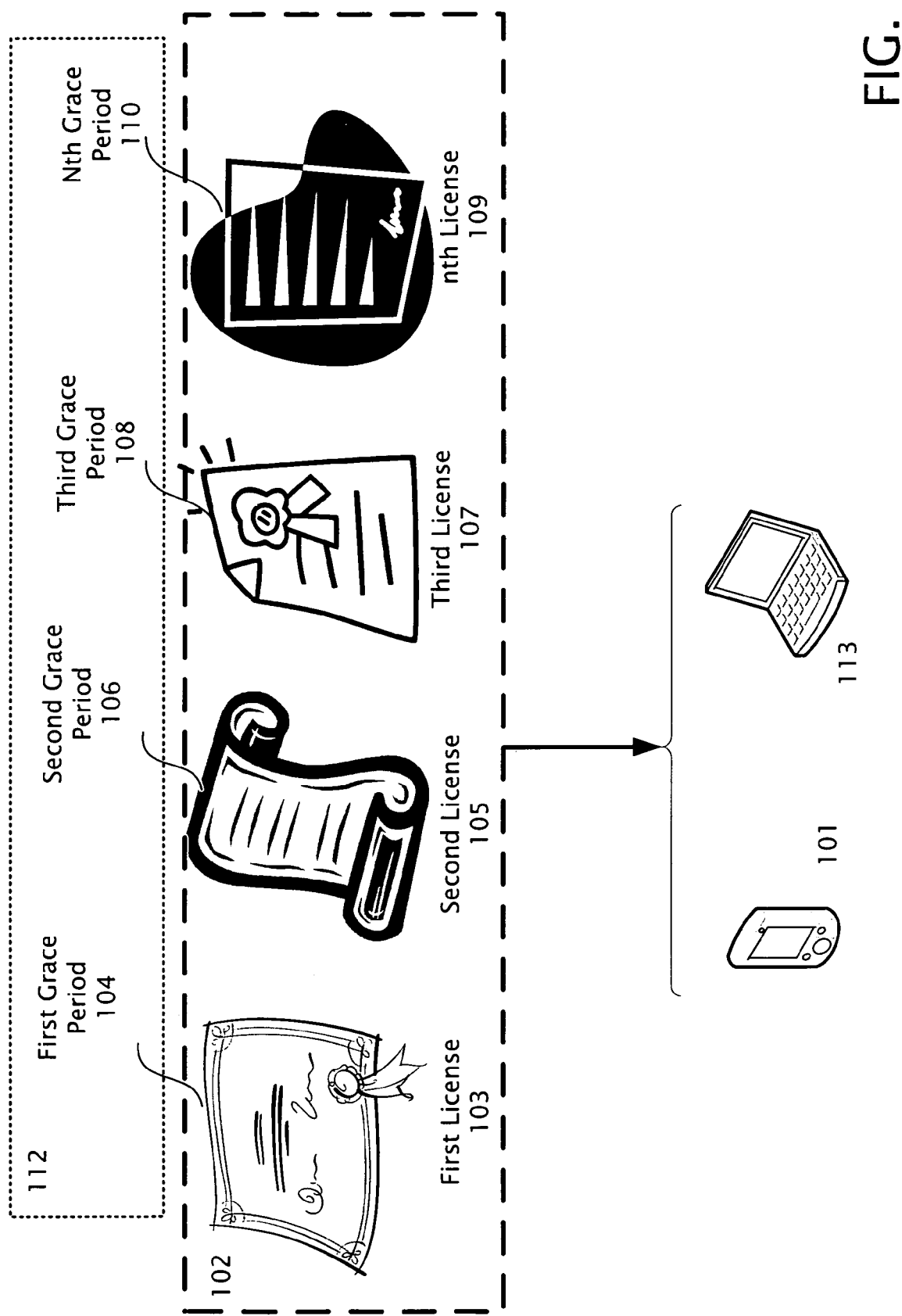
FIG. 1 illustrates a plurality of licenses, including a plurality of assigned grace periods, that typically include individually assigned grace periods that may be associated with each license of a plurality of licenses.

FIG. 1 illustrates a plurality of licenses 102 including an associated plurality of assigned grace periods 112. Each of the individually assigned grace periods 104, 106, 108, 110 of the plurality of grace periods 112 may be associated with each license 103, 105, 107, 109 of the plurality of licenses 102. In particular the licenses contemplated include time based licenses. A grace period is the allotted play time that a media file is allowed to play in case of device's clock gets reset. The grace period play time is only available if the CE device is in "Grace Period" mode. In a typical implementation not all of the licenses need to be supplied with grace period. And, any supplied grace period need not be the same. A time based license is a particular type of license that may be associated with a grace period.

A license typically accompanies a media file (not shown) that has been downloaded to the CE device 101, or to a PC 113. In the past licenses have been typically downloaded with the content, and not separately, although they may be downloaded together. The number of licenses on the CE device 101 can be extremely large, such that a user typically can not keep track of the individual conditions applied to each media file by its associated license. A PC will typically contain even more licenses. Occasionally, more than one license will be associated with a media file.

Licenses typically regulate the use of content. Most current DRM solutions rely on unique identification of user devices, such as CE devices. In such systems each license is typically bound to a unique consumer electronics device (or playback device), so the license stored in one CE device typically can not be transferred or used by another device. The license may be provided with information to specify a Grace Period for the particular media being controlled by that license. The licenses are typically stored separately from the content, typically in a dedicated storage area such as a secure store.

Licenses may include numerous functions, other than simply giving permission to use an associated file. For example information may be provided in the license to control how the file is played by setting the grace period. Grace periods may be used to allow play of content to continue for limited time periods, on a license by license basis if a system clock in the CE device is interrupted. The grace period may be provided in conjunction with other license features as well.

Specialized licenses may also utilize grace periods. A time based license is a license that allows for content rental, subscription models, premiers and previews. A time-based license typically requires that a clock is present on the CE device before it can be used. Thus using grace periods in association with this type of license will also improve a users experience by allowing content to play for a limited time after a reset event, or clock failure.

A users experience may be improved if licenses specify a grace period so that an interruption to the CE device secure clock does not tend to interfere with use of the CE device. A service provider may or may not wish to provide grace periods for a media file. Also a various content owners, or service providers, may wish to provide grace periods of varying lengths of time. Being able to provide grace periods, if desired, and to vary their lengths by individual file allows content owners more control in licensing their content. Grace period may contribute to a DRM system that is invisible to the user. Licenses and the grace period associated with them may be managed by an application program, or by a system of digital rights management.

Figure 2:
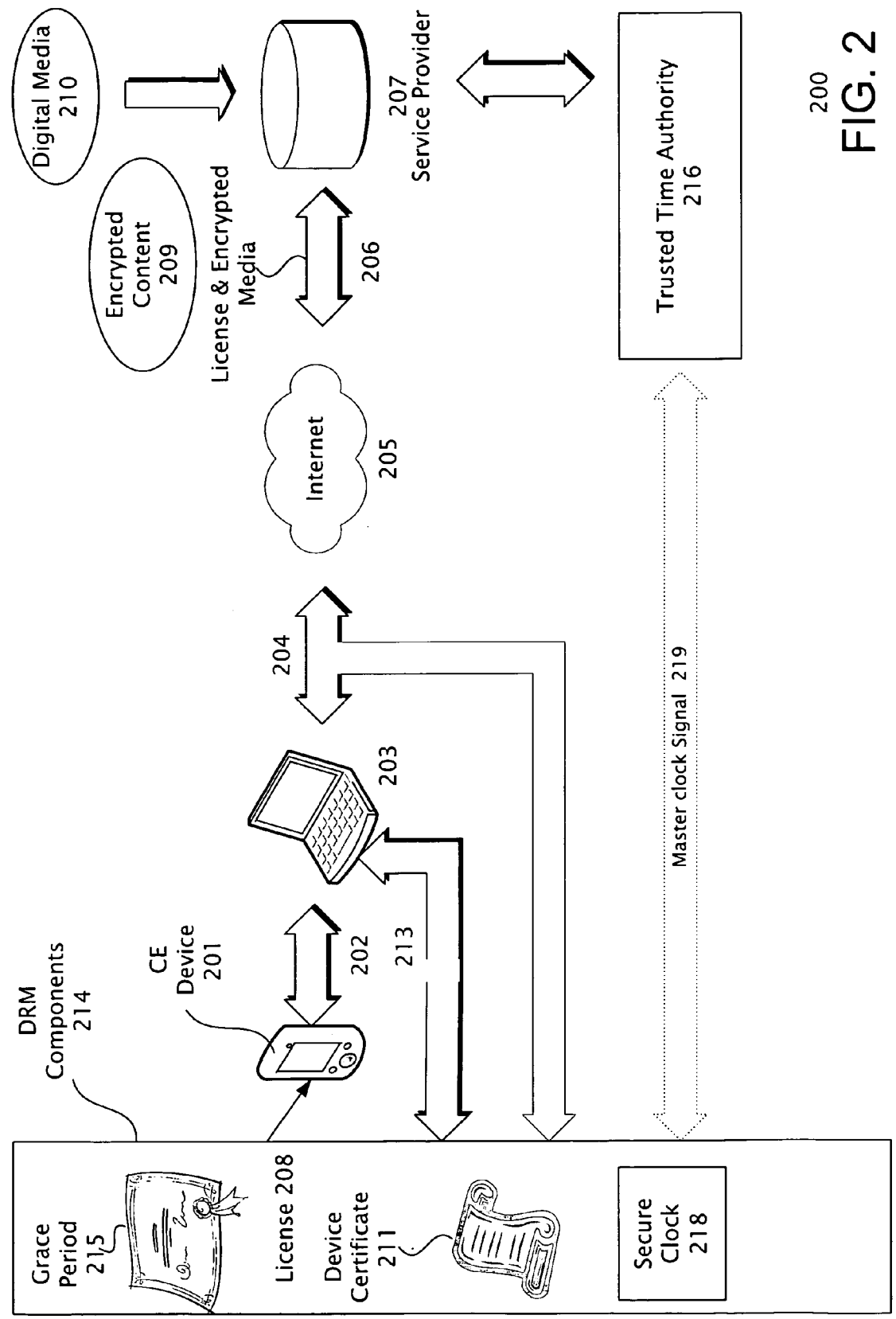
FIG. 2 is a block diagram of an example of a digital rights management system including grace period.

FIG. 2 is a diagram of a DRM system including grace periods and a secure clock. DRM system 200 typically provides a collection of processes for the secure distribution of multimedia content 210 from a service provider 207 coupled 206 to an insecure channel, such as the Internet 205. Digital media content for viewing or playback would typically include music files, picture files, video files, documents, and other protected content, in short anything that a service provider wishes to transmit securely over an unsecured channel.

In particular content may be anything that a provider desires to protect such as music, video, multimedia, pictures and the like. Content is typically regulated to prevent its unauthorized use by providing licenses. Content may be audio, video, textual, encrypted, unencrypted, compressed, uncompressed or otherwise manipulated. In a DRM system the content, (or equivalently media, media files, files, or the like) to be played, can typically be freely transferred. Transfer of encrypted content is typically over unsecured channels such as the internet. In a DRM system the playback of the content is controlled, or allowed, by a license that may be typically stored on a specific CE device. Those skilled in the art will realize that the term "play" as used herein may also be construed to mean consumed, or other equivalent terms that indicate that there are limits placed upon accessing the media file governed by the license. Digital media file 210 is typically encrypted by service provider 207 prior to transmission, and is typically decrypted into an unencrypted media file 209 at the CE device 201 or 203

A personal computer 203 may be used to couple 204 to the internet 205 as a CE device. The computer may also be used to transfer content and licenses from the service provider 207 to another more portable consumer electronics device 201 via the path 202 shown. The personal computer and the CE devices may operate utilizing any number of suitable operating systems known to those skilled in the art to implement the desired DRM processes being activated. The instructions for implementing the functions described in this application may exist as software, hardware (for example instructions burned into an ASIC), or a combination of both.

The PC may act as a main storage location and have a large number of licenses and media files stored on it. The licenses can have grace period, unlimited rights, rights to play the file a certain number of times, rights to play the file until a certain date, and the like. Protocols for transferring information to the PC 203, and to the CE device 201 over paths 202 and 204 may be achieved by conventional connections such as Ethernet, USB, infrared, Bluetooth, MTP and the like. These pathways may be useful for transmitting licenses and content, including licenses that have incorporated grace period.

A CE device 201 may be as previously noted a variety of devices equipped with a processor. As shown here 201 the CE device may be a portable personal electronics device such as a digital juke box, MP3 player, or the like.

In alternative embodiments a consumer electronics device 201 may be coupled 204 to a service provider 207 without using the personal computer 203 as an intermediary. In this example the CE device 201 operates to download media and licenses directly from the internet.

A DRM capable device, such as a CE device 201, or a PC 203, typically includes a number of DRM components 214 utilized by a DRM system. The components 214 are typical, but not limiting, of DRM components. A similar set of components may be associated with the PC 203, but are omitted to simplify the figure. Typical DRM components may include one or more licenses 202, having grace period 215. Also shown as part of a typical DRM system is a device certificate 211 that may uniquely identify the CE device 201 to the DRM system 200. Device certificates may provide cryptographical hand shake information that may facilitate the transfer of information, such as a master clock signal 210 from a trusted time authority 216.

In a typical application, DRM system 200 protects contents 210 by providing encrypted data files 209. Since files 209 are encrypted, the data itself is protected. Thus, the files 209 may be moved, archived, copied, or distributed without restriction. There is no need to hide files or make them inaccessible, or to put special protection in place when files are transmitted from system to system. However, copying a file and giving it to a friend will not enable that friend to use the file. In order to be able to use an encrypted file, users must obtain a license 208. This license 208, that typically includes a grace period 215, is a way of exercising control over the encrypted file 210 and the unencrypted version 209 of the file. A license 208 is typically granted to a single machine 201, and even if copied, it will not tend to function on other machines.

An example of a Digital Rights Management system that may be capable of utilizing Grace Periods is described in U.S. patent application Ser. No. 09/290,363, filed Apr. 12, 1999, U.S. patent application Ser. Nos. 10/185,527, 10/185,278, and 10/185,511, each filed on Jun. 28, 2002 which are hereby incorporated by reference in its entirety.

The DRM system described may include a trusted time authority 216. The trusted time authority 216 may be provided by the service provider 207, or by another suitable source. For example the trusted time authority could be supplied by another PC or even by a system clock available from another source such as by a wireless link to a cellular telephone master clock. The trusted time authority 216 typically provides a known time to a CE device 201, 203, so that a clock on the CE device may be set. The trusted time authority 216 may be coupled 220 through the service provider, or alternatively 219 directly to a CE device 201. The exchange to establish the secure clock may be a cryptographically keyed exchange. The CE device typically includes a secure clock 218 that processes the signal from the trusted time authority. Adjustments to the secure clock are typically inaccessible to a user to prevent tampering with time based licenses that may be present. Secure clocks and the trusted time based authority are described in further detail below.

In a conventional DRM capable device, after a clock reset, a CE device should have access to the trusted time authority to set the device clock. Otherwise it will not be able to play the time based contents. Grace period allows playing content until the trusted time authority can be contacted or until Grace period is expired.

A secure clock is typically used to prevent circumvention of time based licenses by turning the clock back. If the CE device supports "Secure Clock", the clock was previously assumed to be either unset (in unset mode), or set to an accurate time (in normal mode). If device gets reset due to any reason (e.g. batteries exhausted), the clock become unset. The device must set the clock itself by contacting a trusted network source either directly, or by proxying through a PC. To prevent circumvention of the time based license, users are not allowed to manually set the clock. If the network source is not available, time based content will not play on the CE device until the clock is set. Grace periods allow limited play by placing the CE device in a grace period mode.

In the duration called the Grace Period content is allowed to play until the device clock can be securely reset or until the Grace Period duration specified in the license expires. In grace period mode, the device clock is set to "last good known time" after an interruption. Once the device receives an accurate time from the network, it resumes normal operation.

Figure 3:
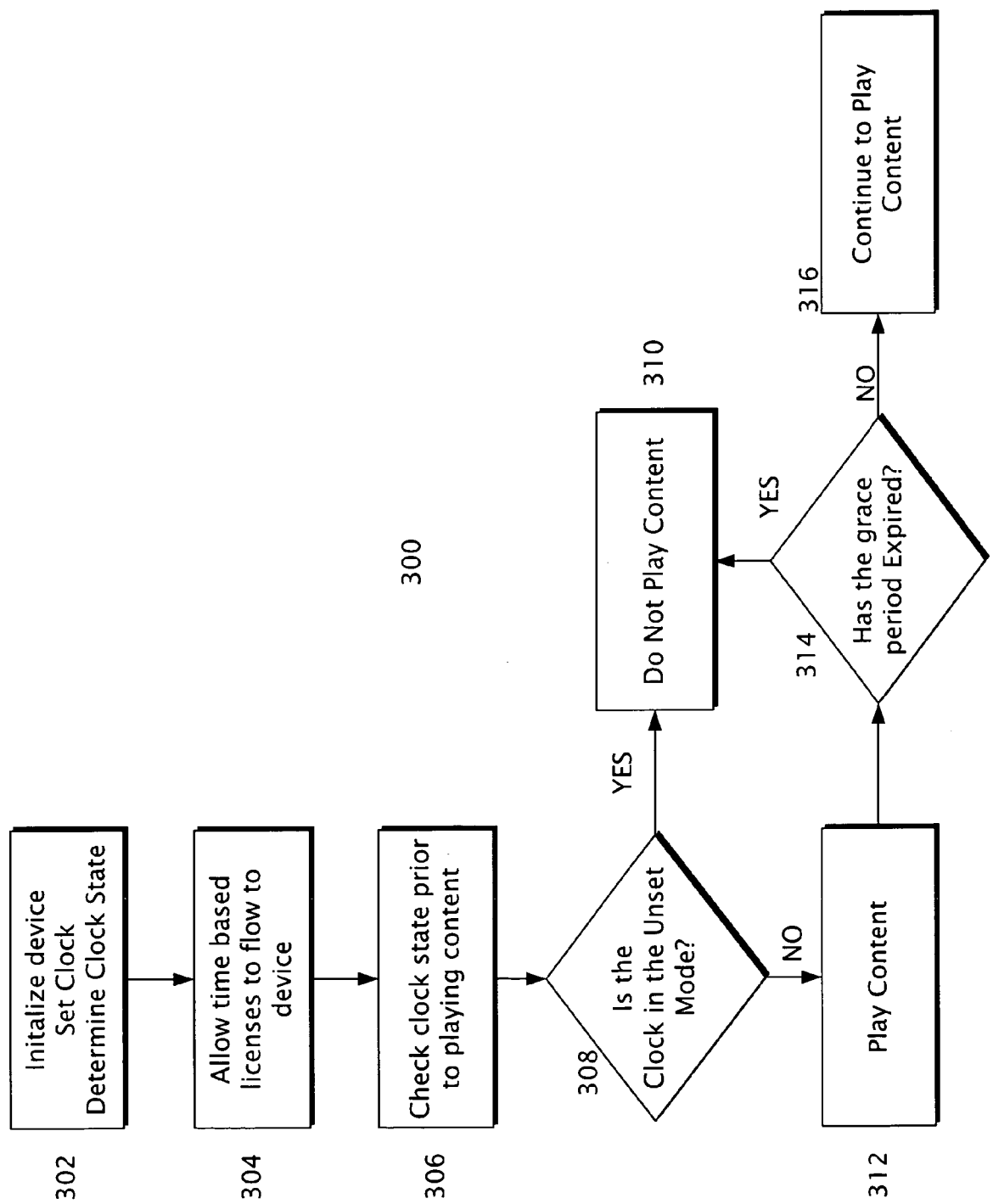
FIG. 3 is a flow diagram showing the process of checking the clock state of a CE device.

FIG. 3 is a flow diagram showing a typical challenge and response process of setting the secure clock state of a CE device. At initial power up the CE device is initialized, its clock state determined, and its clock set by a conventional exchange with a trusted time authority 302. An exemplary exchange of a challenge and response type that may have the following form: secure clock challenge:

```
secure clock challenge:
       <DRMCLOCK type=challenge>
         <DATA>
           <URL>http://www.mysecureclockserver.com </URL>
           <TID>0g8rt2MdiDQ1YjyIJEI==</TID>
         </DATA>
       </DRMCLOCK>
Secure clock response
       <DRMCLOCK type=response>
         < ERROR >Error code<\ERROR> -> Optional node. Present only in case of
       error
         <DATA>
           <TID>0g8rt2MdiDQ1YjyIJEI==<\TID>
           <GMTTIME>Date and time in ZULU format<\GMTTIME>
           <REFRESHDATE>Date and time in ZULU format<\REFRESHDATE>
         </DATA>
         <CERTIFICATECHAIN>
           <CERTIFICATE>AAEAADgAAABHnuWu69pRyZdeXjZXr4JZkE=</CERTIFICATE>
           <CERTIFICATE>AAEAADgAAACp8G4ghjlRqb*OeEJG7pYmQ=</CERTIFICATE>
         </CERTIFICATECHAIN>
         <SIGNATURE>
           <HASHALGORITHM type="SHA" />
             <SIGNALGORITHM type="MSDRM" />
       <VALUEprivate="1">nUcTIHU0g8rt2MdiDQ1YjyIJEIYMV3hclX4JBVVIuTIx5YFtY*89A
       Q==</VALUE>
         </SIGNATURE>
       </DRMCLOCK>
```

If the clock is set and the device is properly initialized then time based licenses are allowed to flow, or be downloaded, to the CE device 304. Prior to playing content the CE device initiates a check of the clock state 306. At block 308 a determination is made to see if the CE device clock is in the unset mode. If it is, then content may not be played 310. Returning to block 308, if the CE device is in the normal, or grace period modes, then the content is allowed to play 312. While playing any grace period present may be monitored 314 for expiration. If the grace period has expired content is not played 310. If the grace period has not expired then the CE device continues to play the content 316.

Figure 4:
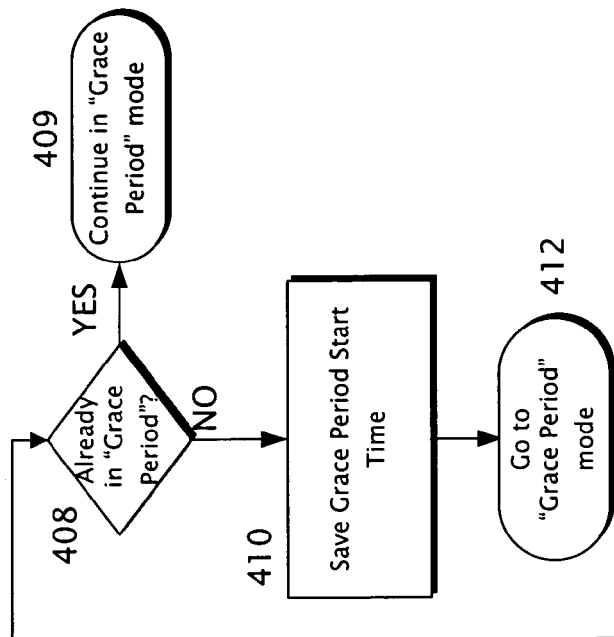
FIG. 4 is a flow diagram detailing the process of entering various clock mode settings in a CE device having a secure clock that will allow or deny playback of content.
Figure 4:
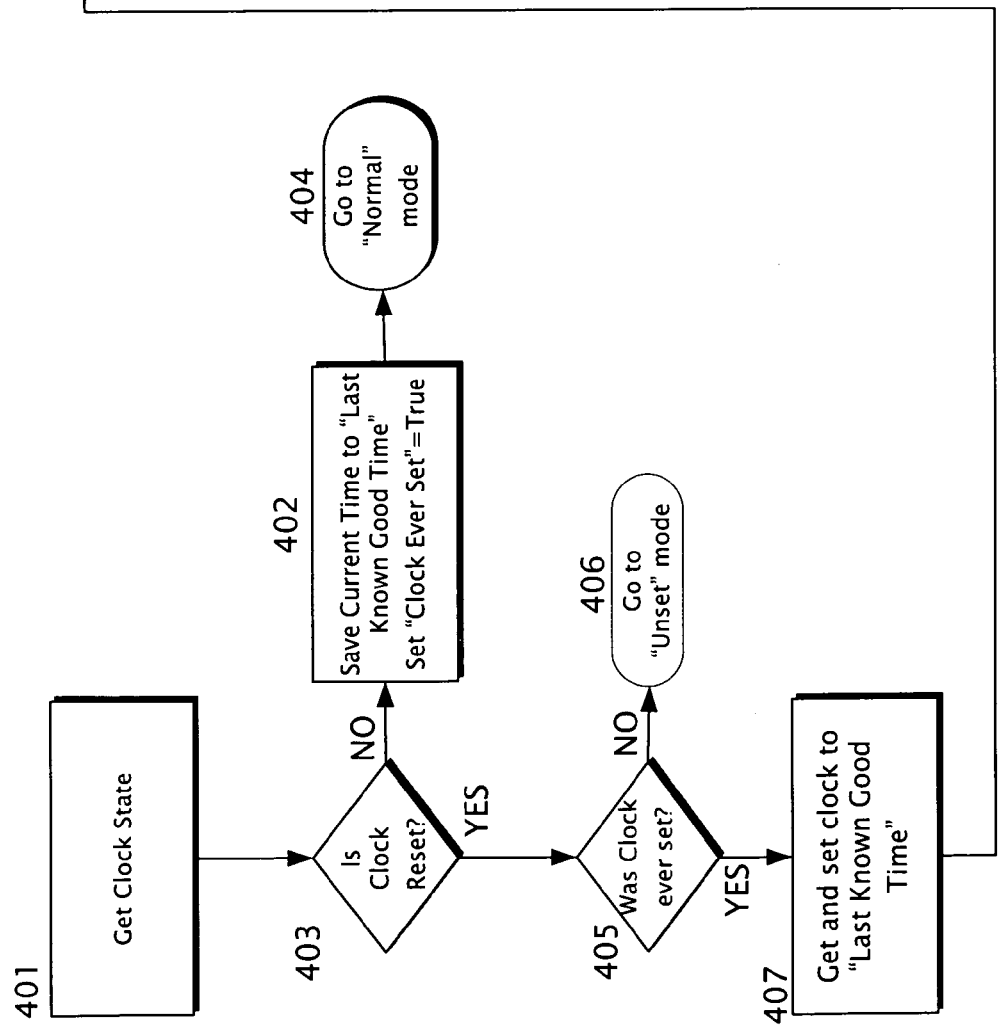

FIG. 4 is a flow diagram detailing the process 307 of determining clock mode settings in a CE device. In the "unset mode" 406 the clock has not been synchronized with trusted time authority and content is not allowed to play.

In the "grace period mode" 409, 412 of operation in a DRM system the device clock is set to "last good known time" after a power loss and a reset of the CE device playing a media file. The last known good time is the last time reading of a plurality of time readings that were stored to the secure store before a clock failure. A CE device enters in "grace period" mode if device is reset, and if the device clock was set before so it memorizes the "last good known time" and sets clock to that time. The last known good time is not accurate time but it is the best guess of the time when the clock ceased operation.

The grace period may be stored in non volatile memory as are play counts and the like. As the grace period has been used up, this elapsed time may be subtracted from the grace period time stored in the non volatile memory so that a grace period may be consumed over a number of CE device resets before the clock is synchronized with the trusted time authority.

When a CE device is initially connected with PC, it is in an unset mode until the clock is set. First the PC queries the CE device about the state of secure clock. The DRM system secure clock settings on the CE device goes to "Unset", "Normal" or "Grace period" mode depending upon the state of the CE device.

After initiation of determining the clock state 401, inquiry is next made to determine if the clock is reset at block 403. If the clock of the CE device has not been reset the CE device may get time from the device and store it as a "last known good time" in secure store. A "clock ever set" flag may be set to a true state. Next the device goes to normal mode at block 404.

Returning to block 403, if the clock is determined to have been reset, a further inquiry is made at block 405 to determine if the clock was ever set. If the clock was never set the CE device goes into the unset mode as shown in block 406. If the clock has been set the process proceeds to block 407. At block 407 the clock goes to the last known good time. The device clock is set to this time.

At block 408 an inquiry is made to determine if the CE device is already in the grace period. If it is then the CE device continues in the grace period mode as shown in block 409. If the CE device is not in the grace period mode then the process proceeds to block 410.

Next the current time is stored as the grace period start time at block 410. And finally the CE device goes into the grace period mode at block 412.

If the license specifies a grace period duration, the media file governed by the license can be played for the grace period duration if the device is operating in the grace period mode of operation. The duration of the grace period is typically specified in the license. Whenever the CE device goes in "Grace period" mode for the first time, that time is recorded as "Grace period start time". This time is used to evaluate the license in grace period. If the difference between current time and "Grace period start time" is less than the duration of the "Grace period", content will play.

The next time the device gets the time from network, the DRM system clears all Grace Period related flags, and sets the accurate time. Then saves this accurate time as "Last known good time" and puts device in "normal" state.

Secure Clock and Trusted Time Authority

As discussed above, a license associated with a media file may include a temporal requirement or restriction. For example a restriction might be that the media file can not be rendered before and/or after a certain time. In implementing this restriction, reference may be made during license evaluation to a clock on the CE device for a current time. However, a user may circumvent such a temporal restriction merely by falsely setting the clock on the CE device to a time that satisfies the temporal restriction. A secure clock tends to prevent this type of circumvention, and may be called upon in the challenge and response exchange described above for setting the secure clock.

Figure 5:
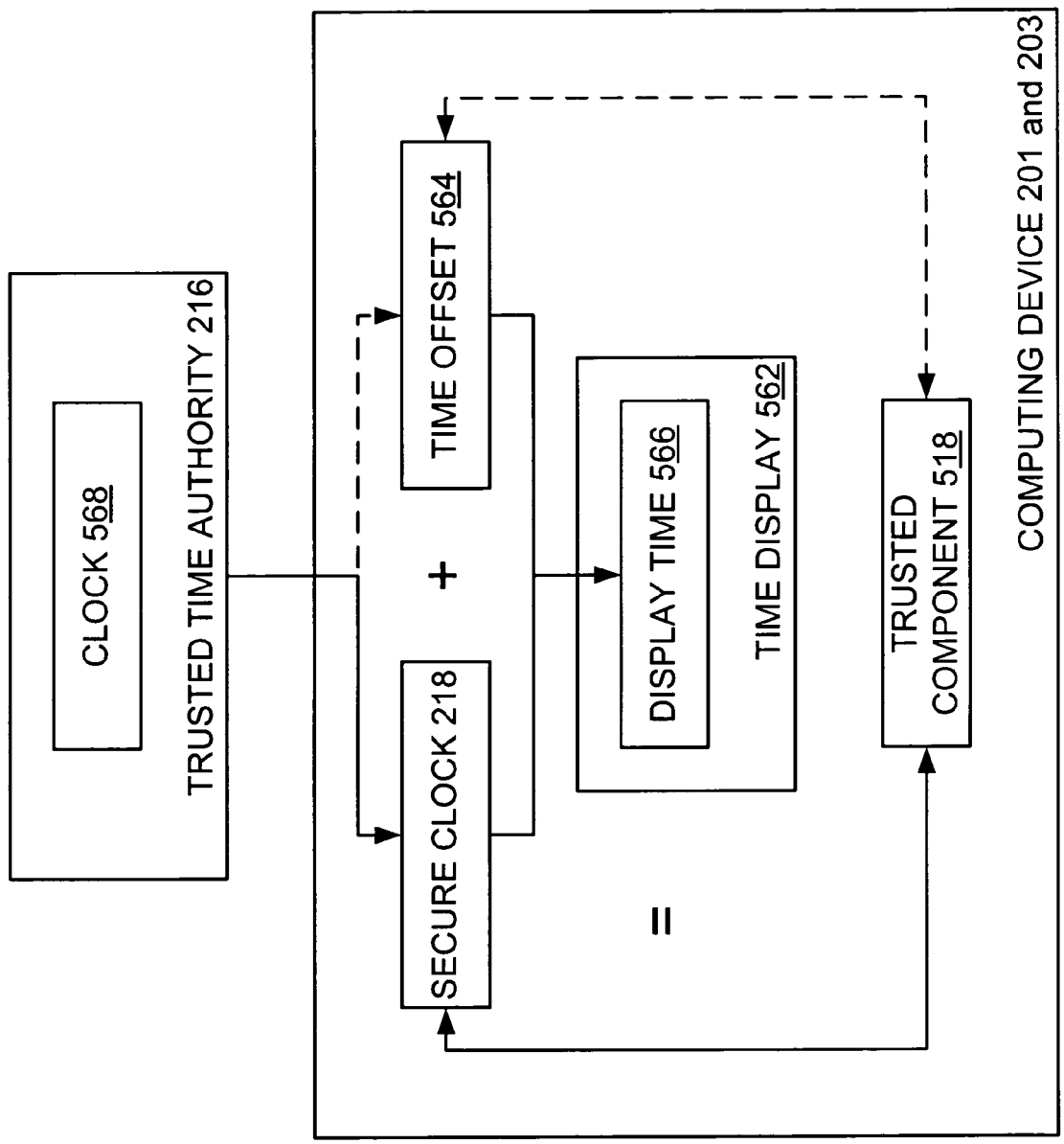
FIG. 5 is a block diagram showing a trusted time authority in communication with a CE device.

FIG. 5 depicts is a block diagram showing a trusted time authority 216 coupled to the secure clock 218 of a CE device 201 203. A trusted time authority may be provided by a service provider sending a trusted time over the internet, a wireless link, a telephone line, a pager backlink, or any other equivalent method. In addition a trusted time authority may also be provided by a PC, another CE device, or the like capable of supplying a known good time. The clock referred to by a license evaluator of the DRM system is a running real-time secure clock 522 that may not be adjusted by the user. Instead, the secure clock 522 can only be adjusted according to trusted time as received from a trusted time authority 216 that is external to the computing device 201, 203. The trusted time authority 216 may be any appropriate entity capable of providing a secure time base. For example, the trusted time authority 216 may be represented by a server coupled to the computing device 201, 203 by way of a network such as a LAN, a WAN, the Internet, an Intranet, or the like.

The trusted time authority 216 typically maintains a trusted time in any appropriate convention, and the secure clock 522 on the computing device 201, 203 is adjusted to the trusted time, either by the trusted time authority 216, the computing device 201, 203, the trusted component 518 thereon, or the like.

Trusted time may be kept with respect to a particular time zone or an absolute time—for example, Eastern U.S. time, coordinated universal time (UTC), astronomical time, etc. Such trusted time typically includes date information and time of day information, and is expressed according to a recognizable convention. For example, trusted time at 1:23:46 PM on Apr. 11, 2002, UTC, may be expressed as 20020411132346Z, where 2002 represents the year, 04 represents April, 11 represents the day, 13 represents the hour, 23 represents the minute, 46 represents the second, and Z represents UTC. Of course, any appropriate convention for trusted time may be employed.

A computing device 14 with a secure clock 522 may have an appropriate time display 562 for displaying time to a user of such computing device 201, 203. In some applications a time display may not be provided Such time display 562 may be any appropriate display 562, for example an LED, LCD display, an on-screen display or the like. However, the trusted time as maintained by the secure clock 522 may not necessarily be amenable for displaying on the time display 562. For example, if trusted time is maintained according to the UTC convention and the user is in the United States Eastern time zone (ET), the trusted time may actually be 4 or 5 hours ahead of local time for the user.

In one example of providing a trusted time base, the computing device 201, 203 also has a time offset 564 within which is a time value that may be adjustable by the user. Thus, the computing device 201, 203 can calculate a running real-time display time 566 equal to the trusted time on the secure clock 522 plus the time value in the time offset 564, where the display time 566 is displayed in the time display 562 of the computing device. Notably, while the user can adjust the time value in the time offset 564 to adjust the display time 566 shown in the display 562, such user cannot likewise adjust the trusted time as maintained in the secure clock 522. Thus a trust-based system such as the DRM system can refer to the secure clock 522 for trusted time without fear that such trusted time has somehow been modified by a user who may wish to subvert a temporal requirement in a license.

While the user may adjust the time value in the time offset 564, such a capability is not a requirement in providing a secure clock. In fact, in one alternative example, the time value in the time offset 564 is limited to one or more predetermined values such as may correspond to time differences that arise from time zones or the like. In addition, the time value in the time offset 564 may be controlled by the trusted time authority 216, the computing device 201, 203, the DRM system, other trust-based system, or the like.

In an alternative example, the trusted component 518 on the computing device 201, 203 is employed to receive trusted time from the trusted time authority 216. Thus, encryption-based signing and verification keys are employed by the trusted component 518 and the trusted time authority 216 to produce signed messages and/or certificates that that may be verified as being valid.

At some point during operation of the trusted component 518 and/or the computing device 201, 203, it may be determined that the secure clock 522 must be set according to trusted time as received from the trusted time authority 216. Regardless of how or when the determination is made, in one example the secure clock 522 is set by having the trusted time authority 216 send a new secure time for the secure clock 522 of the computing device 201, 203. An example of setting the secure clock is provided by a conventional challenge response process with a trusted time authority 302. A challenge is sent to the trusted time authority 216 from the trusted component 518 and/or the computing device 201, 203. After receiving a response from trusted time authority 216, the response is verified by the trusted component 518. If the verification is successful, clock is set to a secure time received in the response.

An example of a secure clock and a trusted time authority that may be capable of utilizing Grace Periods is described in U.S. patent application Ser. No. 10/171,269, filed Jun. 13, 2002, which is hereby incorporated by reference in its entirety.

Figure 6:
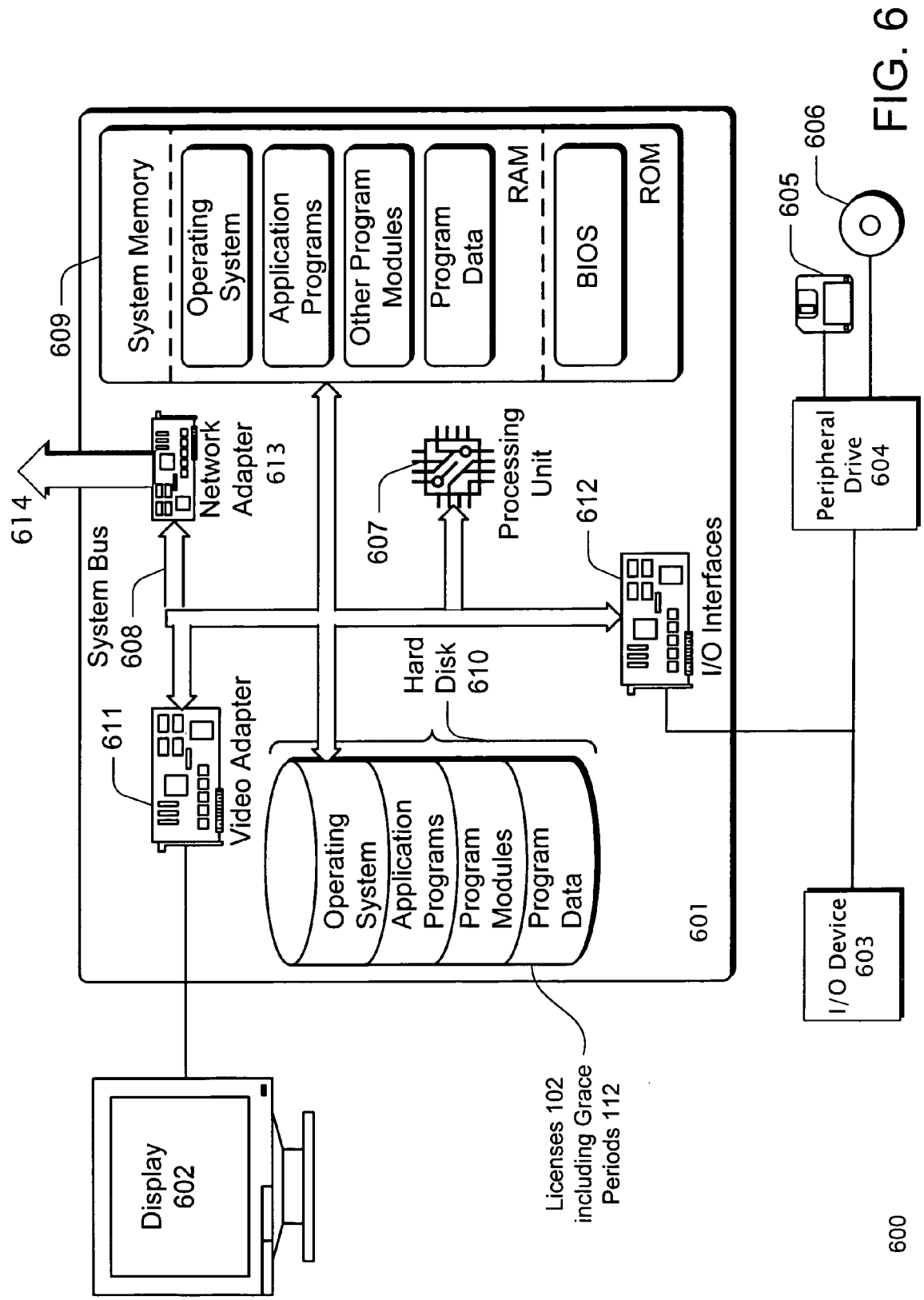
FIG. 6 illustrates an exemplary computing environment in which the grace periods and secure clock described in this application, may be implemented Like reference numerals are used to designate like parts in the accompanying drawings.

FIG. 6 illustrates an exemplary computing environment 600 in which the grace periods described in this application, may be implemented. Exemplary computing environment 600 is only one example of a computing system and is not intended to limit the examples described in this application to this particular computing environment.

The computing environment 600 can be implemented with numerous other general purpose or special purpose computing system configurations. Examples of well known computing systems, may include, but are not limited to, personal computers, hand-held or laptop devices, microprocessor-based systems, multiprocessor systems, set top boxes, programmable consumer electronics, gaming consoles, Consumer electronics, cellular telephones, PDAs, and the like.

The computer 600 includes a general-purpose computing system in the form of a computing device 601. The components of computing device 601 can include one or more processors (including CPUs, GPUs, microprocessors and the like) 607, a system memory 609, and a system bus 608 that couples the various system components. Processor 607 processes various computer executable instructions to control the operation of computing device 601 and to communicate with other electronic and computing devices (not shown). The system bus 608 represents any number of several types of bus structures, including a memory bus or memory controller, a peripheral bus, an accelerated graphics port, and a processor or local bus using any of a variety of bus architectures.

The system memory 609 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 607.

Mass storage devices 604 may be coupled to the computing device 601 or incorporated into the computing device by coupling to the buss. Such mass storage devices 604 may include a magnetic disk drive which reads from and writes to a removable, non volatile magnetic disk (e.g., a "floppy disk") 605, or an optical disk drive that reads from and/or writes to a removable, non-volatile optical disk such as a CD ROM or the like 606. Computer readable media 605, 606 typically embody computer readable instructions, data structures, program modules and the like supplied on floppy disks, CDs, portable memory sticks and the like.

Any number of program modules can be stored on the hard disk 610. For example a number of licenses 102, including grace periods 112. Mass storage device 604, ROM and/or RAM 609, including by way of example, an operating system, one or more application programs, other program modules, and program data. Each of such operating system, application programs, other program modules and program data (or some combination thereof) may include an embodiment of the systems and methods described herein.

A display device 602 can be connected to the system bus 608 via an interface, such as a video adapter 611. A user can interface with computing device 602 via any number of different input devices 603 such as a keyboard, pointing device, joystick, game pad, serial port, and/or the like. These and other input devices are connected to the processors 607 via input/output interfaces 612 that are coupled to the system bus 608, but may be connected by other interface and bus structures, such as a parallel port, game port, and/or a universal serial bus (USB).

Computing device 600 can operate in a networked environment using connections to one or more remote computers through one or more local area networks (LANs), wide area networks (WANs) and the like. The computing device 601 is connected to a network 614 via a network adapter 613 or alternatively by a modem, DSL, ISDN interface or the like.

Those skilled in the art will realize that storage devices utilized to store program instructions can be distributed across a network. For example a remote computer may store a tool such as the adaptive instrumentation runtime monitoring and analysis software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A system for allowing playback of a digital media file, the system comprising:
   a consumer electronics (CE) device comprising a secure clock that cannot be adjusted by a user of the CE device, the secure clock configured for synchronizing to a trusted time provided by a trusted time authority server, the CE device configured for entering, in response to the secure clock not being synchronized to the trusted time but previously being synchronized to the trusted time, a grace period mode, the CE device further configured for maintaining, until the secure clock is re-synchronized to the trusted time, the grace period mode, the CE device further configured for not allowing playback of the digital media file and for not entering the grace period mode in response to the CE device being in an unset mode, wherein the unset mode indicates that the secure clock has never been synchronized to the trusted time provided by the trusted time authority server;
   a license comprising a grace period, the license disposed upon the CE device and associated with the digital media file;
   the CE device further configured for allowing, in response to the entering and the maintaining the grace period mode, the playback of the digital media file until the secure clock is re-synchronized to the trusted time or until the grace period expires.

2. The system for allowing the playback of the digital media file of claim 1, the CE device further configured for periodically synchronizing the secure clock with the trusted time authority.

3. The system for allowing the playback of the digital media file of claim 1, further comprising:
   the CE device further configured to determine that the secure clock has failed; and
   the CE device further configured to play, in response to the determining and according to the grace period, the digital media file governed by the license.

4. The system for allowing the playback of the digital media file of claim 3, the CE device further configured to periodically record a last known good time in a secure store.

5. The system for allowing the playback of the digital media file of claim 4, the CE device further configured to set the secure clock to the last known good time in response to a failure of the secure clock.

6. The system for allowing the playback of the digital media file of claim 5, wherein the grace period is reduced as time progresses from the last known good time.

7. The system for allowing the playback of the digital media file of claim 1, the entering in further response to a failure of the secure clock.

8. The system for allowing the playback of the digital media file of claim 1, wherein the license is a time based license.

9. A method of allowing playback of a digital media file on a consumer electronics (CE) device, the method comprising:
- determining a failure to synchronize a clock of the CE device to a trusted time provided by a trusted time authority, wherein the clock cannot be adjusted by a user of the CE device;
- setting, by the CE device in response to the clock previously being synchronized to the trusted time, the clock to a last known good time;
- entering, by the CE device in response to the clock previously being synchronized to the trusted time, a grace period mode;
- maintaining, by the CE device until the clock is re-synchronized to the trusted time, the grace period mode; and
- allowing, by the CE device in response to the entering and the maintaining the grace period mode, the playback of the digital media file, wherein the CE device is configured for not allowing playback of the digital media file and for not entering the grace period mode in response to the CE device being in an unset mode, wherein the unset mode indicates that the clock has never been synchronized to the trusted time provided by the trusted time authority.

10. The method of claim 9 further comprising saving a grace period start time.

11. The method of claim 9 wherein the allowing continues while maintaining the grace period mode until the grace period expires.

12. A method of providing a grace period comprising:
- obtaining a clock state of a secure clock of a consumer electronics (CE) device, wherein the secure clock cannot be adjusted by a user of the CE device, and wherein the secure clock is configured for synchronizing to a trusted time provided by a trusted time authority server;
- setting, by the CE device in response to the secure clock not being synchronized to the trusted time but previously being synchronized to the trusted time, the secure clock to a last known good time;
- setting, by the CE device in response to the secure clock not being synchronized to the trusted time but previously being synchronized to the trusted time, the clock state to a grace period mode; and
- saving the last known good time as a grace period start time, wherein the CE device is configured for not entering the grace period mode in response to the CE device being in an unset mode, wherein the unset mode indicates that the secure clock has never been synchronized to the trusted time provided by the trusted time authority server.

13. The method of providing a grace period of claim 12, wherein the grace period start time indicates a start of the grace period.

14. The method of providing a grace period of claim 13, wherein a duration of the grace period is specified in a license corresponding to a media file.

15. The method of providing a grace period of claim 14, further comprising playing the media file no longer than the grace period duration.

* * * * *